US011111387B2

(12) United States Patent
Nagi

(10) Patent No.: US 11,111,387 B2
(45) Date of Patent: Sep. 7, 2021

(54) LIQUID CRYSTAL ALIGNING AGENT, LIQUID CRYSTAL ALIGNMENT FILM, AND LIQUID CRYSTAL DISPLAY ELEMENT

(71) Applicant: NISSAN CHEMICAL INDUSTRIES, LTD., Chiyoda-ku (JP)

(72) Inventor: Tatsuya Nagi, Funabashi (JP)

(73) Assignee: NISSAN CHEMICAL INDUSTRIES, LTD., Chiyoda-ku (JP)

( * ) Notice: Subject to any disclaimer, the term of this patent is extended or adjusted under 35 U.S.C. 154(b) by 0 days.

(21) Appl. No.: 15/748,461

(22) PCT Filed: Jul. 29, 2016

(86) PCT No.: PCT/JP2016/072279
§ 371 (c)(1),
(2) Date: Jan. 29, 2018

(87) PCT Pub. No.: WO2017/018501
PCT Pub. Date: Feb. 2, 2017

(65) Prior Publication Data
US 2018/0244922 A1    Aug. 30, 2018

(30) Foreign Application Priority Data

Jul. 30, 2015  (JP) .............................. JP2015-151105

(51) Int. Cl.
| | |
|---|---|
| *C08L 101/02* | (2006.01) |
| *C08F 238/00* | (2006.01) |
| *C08F 232/08* | (2006.01) |
| *C09K 19/02* | (2006.01) |
| *C09K 19/38* | (2006.01) |
| *C08F 220/34* | (2006.01) |
| *C08F 220/30* | (2006.01) |
| *C08F 20/30* | (2006.01) |
| *C08F 216/36* | (2006.01) |
| *C09K 19/56* | (2006.01) |
| *C08L 101/12* | (2006.01) |
| *G02F 1/1337* | (2006.01) |

(52) U.S. Cl.
CPC ............ *C08L 101/02* (2013.01); *C08F 20/30* (2013.01); *C08F 216/36* (2013.01); *C08F 220/30* (2013.01); *C08F 220/34* (2013.01); *C08F 232/08* (2013.01); *C08F 238/00* (2013.01); *C08L 101/12* (2013.01); *C09K 19/0208* (2013.01); *C09K 19/3833* (2013.01); *C09K 19/3852* (2013.01); *C09K 19/56* (2013.01); *G02F 1/133711* (2013.01); *G02F 1/133753* (2013.01); *C08F 220/301* (2020.02); *C08F 220/302* (2020.02); *C08F 220/303* (2020.02); *C08F 220/346* (2020.02); *C09K 2323/00* (2020.08); *C09K 2323/02* (2020.08); *G02F 1/133726* (2021.01); *G02F 1/133746* (2021.01); *G02F 1/133757* (2021.01); *G02F 1/133788* (2013.01); *G02F 2201/12* (2013.01); *G02F 2202/023* (2013.01)

(58) Field of Classification Search
CPC ...... C08L 101/02; C08L 101/12; C08F 20/30; C09K 19/0208; C09K 19/3833; C09K 19/3852; C09K 19/56; C09K 2323/00; C09K 2323/02; C09K 2323/027; G02F 1/1337; G02F 1/133711; G02F 1/133788; G02F 2202/023; Y10T 428/10; Y10T 428/1005; Y10T 428/1023
USPC ........ 428/1.1, 1.2, 1.25, 1.26; 349/123, 124, 349/127, 130
See application file for complete search history.

(56) References Cited

U.S. PATENT DOCUMENTS

2004/0138394 A1    7/2004  Buchecker et al.

FOREIGN PATENT DOCUMENTS

| CN | 103282824 A | 9/2013 |
|---|---|---|
| CN | 104246591 A | 12/2014 |
| JP | 2-223916 A | 9/1990 |
| JP | 4-281427 A | 10/1992 |
| JP | 5-43687 A | 2/1993 |
| JP | 10-333153 A | 12/1996 |
| JP | 2000-212310 A | 8/2000 |
| JP | 2002-90540 A | 3/2002 |
| JP | 2002-348330 A | 12/2002 |
| JP | 2003-2927 A | 1/2003 |
| JP | 2004-530734 A | 10/2004 |
| JP | 3893659 B2 | 3/2007 |
| JP | 2012-77228 A | 4/2012 |

(Continued)

OTHER PUBLICATIONS

International Search Report dated Sep. 20. 2016 in PCT/JP2016/072279, citing documents AG through AO therein, 2 pages.

(Continued)

*Primary Examiner* — Ruiyun Zhang
(74) *Attorney, Agent, or Firm* — Oblon, McClelland, Maier & Neustadt, L.L.P.

(57) ABSTRACT

The present invention relates to a polymer composition which contains (A) a photosensitive side-chain polymer that exhibits liquid crystallinity in a predetermined temperature range and has a repeating unit comprising a vertically aligning group, and (B) an organic solvent. The present invention provides: a liquid crystal alignment film which has excellent tilt angle characteristics, while being provided with alignment controllability with high efficiency; a polymer composition which enables the achievement of this liquid crystal alignment film; a twisted nematic liquid crystal display element; and a vertical field switching mode liquid crystal display element.

11 Claims, No Drawings

(56) References Cited

FOREIGN PATENT DOCUMENTS

| JP | 2014-169435 A | 9/2014 |
| WO | WO 2012/002511 A1 | 1/2012 |
| WO | WO 2014/054785 A2 | 4/2014 |
| WO | WO 2015/012341 A1 | 1/2015 |

OTHER PUBLICATIONS

Kobayashi, S., et al., "Liquid Crystal Alignment on Photopolymer Surfaces Exposed by Linearly Polarized UV Light", Journal of Photopolymer Science and Technology, vol. 8 No. 2, 1995, pp. 257-262.

Shadt, M., et al., "Optical Patterning of Multi-Domain Liquid-Crystal Displays with Wide Viewing Angles", Letters to Nature, vol. 361, May 16, 1996, pp. 212-215.

LIQUID CRYSTAL ALIGNING AGENT, LIQUID CRYSTAL ALIGNMENT FILM, AND LIQUID CRYSTAL DISPLAY ELEMENT

TECHNICAL FIELD

The present invention relates to a novel polymer composition, a liquid crystal alignment film using the same, and a method for producing a substrate including the alignment film. Further, the present invention relates to a novel method for producing a liquid crystal display element excellent in tilt angle properties.

BACKGROUND ART

Liquid crystal display elements are known as lightweight, thin and low power consumption display devices, and have been remarkably developed in recent years, such as being used for large television applications. The liquid crystal display element is constituted, for example, of a pair of transparent substrates provided with electrodes and nipping a liquid crystal layer. In the liquid crystal display element, an organic film formed from an organic material is used as a liquid crystal alignment film such that the liquid crystal is in a desired alignment state between the substrates.

That is, the liquid crystal alignment film is a constituent member of the liquid crystal display element, is formed on the surface of the substrate nipping the liquid crystal on which the substrate is in contact with the liquid crystal, and plays a role of aligning the liquid crystal in a certain direction between the substrates. In addition to the role of aligning the liquid crystal in a certain direction such as a direction parallel to the substrate, a role of controlling the pretilt angle of the liquid crystal is sometimes required for the liquid crystal alignment film. The ability of the liquid crystal alignment film to control the alignment of the liquid crystal (hereinafter referred to as "alignment control ability") is imparted by subjecting the organic film constituting the liquid crystal alignment film to an alignment treatment.

As a method of alignment treatment of the liquid crystal alignment film for imparting alignment control ability, a rubbing method has been conventionally known. The rubbing method is a method in which the surface of an organic film of, for example, polyvinyl alcohol, polyamide, or polyimide on a substrate is rubbed (subjected to rubbing) in a certain direction with cloth such as cotton, nylon, polyester, or the like and thus the liquid crystal is aligned in a direction in which the surface has been rubbed (rubbing direction). This rubbing method has been used in the conventional production process of a liquid crystal display element because the rubbing method can easily realize a relatively stable alignment state of liquid crystal. As the organic film used for the liquid crystal alignment film, a polyimide organic film excellent in reliability of heat resistance and the like and excellent in electrical characteristics has been mainly selected.

However, the rubbing method of rubbing the surface of the liquid crystal alignment film formed from polyimide or the like sometimes causes problems such as dust generation and generation of static electricity. In addition, due to high definition of liquid crystal display elements in recent years and unevenness due to electrodes on corresponding substrates and switching active elements for driving liquid crystal, the surface of the liquid crystal alignment film sometimes cannot be uniformly rubbed with cloth, and thus the uniform alignment of the liquid crystal cannot be realized in some cases.

Therefore, a photoalignment method is extensively studied as another alignment treatment method of the liquid crystal alignment film in which rubbing is not performed.

There are various methods for the photoalignment method, where anisotropy is generated in the organic film constituting the liquid crystal alignment film by linearly polarized light or collimated light, and the liquid crystal is aligned in accordance with the anisotropy.

As a main photoalignment method, a decomposition type photoalignment method is known. For example, the polyimide film is irradiated with polarized ultraviolet light, and anisotropic decomposition is caused by utilizing the polarization direction dependence of absorption of ultraviolet light of the molecular structure. Then, the liquid crystal is aligned by polyimide remaining without being decomposed (see, for example, Patent Document 1).

Meanwhile, the liquid crystal alignment film also plays a role of imparting a certain inclination angle (pretilt angle) to the liquid crystal, and the imparting of the pretilt angle has become an important issue in the development of the liquid crystal alignment film (see Patent Documents 2 to 5).

In addition, a photo-alignment method of photo-crosslinking type is also known. For example, by using polyvinyl cinnamate and emitting polarized ultraviolet light, a dimerization reaction (crosslinking reaction) is caused in the double bond portion of two side chains parallel to the polarized light. Further, by emitting the polarized ultraviolet light in an oblique direction, a pretilt angle is developed (see, for example, Non-Patent Document 1). In addition, in order to impart a pretilt angle by a photoalignment method, a specific polymer is used to emit light in an oblique direction (Patent Document 6 and Non-Patent Document 2).

As in the above examples, in the alignment treatment method of liquid crystal alignment film using the photoalignment method, rubbing is unnecessary, and generation of dust and static electricity is not a concern. An alignment treatment can be performed also on a substrate of a liquid crystal display element having irregularities on the surface thereof, which is a method of alignment treatment of a liquid crystal alignment film suitable for an industrial production process. In addition, since the photoalignment method can control the alignment direction of the liquid crystal by ultraviolet light, it is possible to compensate the viewing angle dependency by forming a plurality of regions (alignment division) having different alignment directions in pixels, and this contributes to improving the display quality of the liquid crystal display element.

PRIOR ART LIST

Patent Document

Patent Document 1: JP 3893659 B2
Patent Document 2: JP 02-223916 A
Patent Document 3: JP 04-281427 A
Patent Document 4: JP 05-043687 A
Patent Document 5: JP 10-333153 A
Patent Document 6: JP 2000-212310 A Non Patent Document Non-Patent Document 1: S. Kobayashi et al., Journal of Photopolymer Science and Technology, Vol. 8, No. 2, pp 25-262 (1995).
Non-Patent Document 2: M. Shadt et al., Nature. Vol 381, 212 (1996).

SUMMARY OF INVENTION

Problems to be Solved by the Invention

As described above, the photoalignment method eliminates the necessity of rubbing step itself as compared with the rubbing method conventionally used industrially as the alignment treatment method of the liquid crystal display element, and therefore has a great advantage. In addition, as compared with the rubbing method in which the alignment control ability is made substantially constant by rubbing, the photoalignment method can control the alignment control ability by changing the irradiation amount of polarized light. However, in the photoalignment method, in order to realize the same degree of alignment control ability as in the case of the rubbing method, stable alignment of the liquid crystal may not be realized, for example, because a large irradiation amount of polarized light is required.

For example, in the decomposition type photoalignment method described in Patent Document 1 described above, it is necessary to irradiate a polyimide film with ultraviolet light from a high-pressure mercury lamp with an output of 500 W for 60 minutes. That is, a large amount of ultraviolet light needs to be emitted for a long time. In addition, also in the case of the photoalignment method of dimerization type or photoisomerization type, sometimes a large irradiation amount of ultraviolet light as large as several J (Joule) to several tens J may be necessary. Furthermore, in the case of a photoalignment method of photocrosslinking type or photoisomerization type, the thermal stability and light stability of the alignment of the liquid crystal are inferior, and thus there has been a problem that alignment defect or display image stacking occurs in a produced liquid crystal element.

In addition, in the method of Patent Document 6, a halogenated solvent such as a chloroform solvent is used because the solubility of a specific polymer is low, and there is still a problem for use in a practical situation.

Therefore, in the photoalignment method, high efficiency of alignment treatment and realization of stable liquid crystal alignment are required, and a liquid crystal alignment film and a liquid crystal aligning agent that are capable of highly efficiently imparting high alignment control ability to a liquid crystal alignment film.

An object of the present invention is to provide a substrate including a liquid crystal alignment film for a liquid crystal display element to which alignment control ability is imparted highly efficiently and which is excellent in tilt angle characteristics and a twisted nematic liquid crystal display element and a vertical electric field type liquid crystal display element including the substrate.

In addition to the object described above, another object of the present invention is to provide a twisted nematic type liquid crystal display element and a vertical electric field type liquid crystal display element having improved tilt angle characteristics and a liquid crystal alignment film for the elements.

Means for Solving Problems

As a result of intensive studies to achieve the above object, the present inventors have completed the following invention.

<1> A polymer composition comprising: (A) a side chain type polymer which is a photosensitive side chain type polymer exhibiting liquid crystallinity in a predetermined temperature range and has a repeating unit containing a vertically alignable group; and (B) an organic solvent.

<2> In <1> described above, the vertically alignable group is preferably represented by the following formula (v):

$$-Y^1-Y^2-Y^3-Y^4-(Y^5)_m-Y^6 \qquad (v)$$

[in the formula (v), $Y^1$ represents a single bond or a bonding group selected from —O—, —CH$_2$O—, —COO—, —OCO—, —NHCO—, —NH—CO—O— and —NH—CO—NH—;

$Y^2$ represents a single bond, an alkylene group having 1 to 15 carbon atoms, a —CH$_2$—CH(OH)—CH$_2$-group, or a divalent cyclic group selected from a benzene ring, a cyclohexane ring, and a heterocyclic ring;

an arbitrary hydrogen atom on the cyclic group may be substituted with Z;

$Y^3$ represents a single bond or an alkylene group having 1 to 15 carbon atoms;

$Y^4$ represents a single bond, a divalent cyclic group selected from a benzene ring, a cyclohexane ring or a heterocyclic ring, or a divalent organic group having a steroid skeleton having 17 to 30 carbon atoms;

an arbitrary hydrogen atom on the cyclic group may be substituted with Z;

$Y^5$ represents a divalent cyclic group selected from a benzene ring, a cyclohexane ring or a heterocyclic ring;

any hydrogen atom of these cyclic groups may be substituted with Z;

m represents an integer of 0 to 4, and when m is 2 or more, $Y^5$s may be the same as or different from each other;

$Y^6$ represents a hydrogen atom, an alkyl group having 1 to 17 carbon atoms, a fluorinated alkyl group having 1 to 17 carbon atoms, an alkoxy group having 1 to 17 carbon atoms, or a fluorinated alkoxy group having 1 to 17 carbon atoms; and Z represents an alkyl group having 1 to 3 carbon atoms, an alkoxy group having 1 to 3 carbon atoms, a fluorinated alkyl group having 1 to 3 carbon atoms, a fluorinated alkoxy group having 1 to 3 carbon atoms, or a fluorine atom, wherein the alkylene group, the alkyl group, the fluorinated alkyl group, the alkoxy group, and the fluorinated alkoxy group may include therein 1 to 3 of the bonding groups described above as long as the bonding groups are not adjacent to each other, and in $Y^2$ to $Y^6$, an alkylene group, a —CH$_2$—CH(OH)—CH$_2$— group, a divalent cyclic group, a divalent organic group having a steroid skeleton, an alkyl group, and an fluorinated alkyl group may be bonded to a group adjacent thereto via the bonding group described above, where the total number of carbon atoms of substituents represented by $Y^2$ to $Y^6$ is 1 to 30].

<3> In <1> or <2> described above, the component (A) preferably has a photosensitive side chain that causes photocrosslinking, photoisomerization, or photo-Fries rearrangement.

<4> In any one of <1> to <3> described above, the component (A) preferably has one or more photosensitive side chains selected from the group consisting of the following formulae (1) to (6):

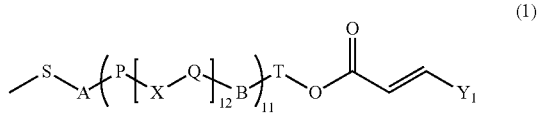
(1)

-continued

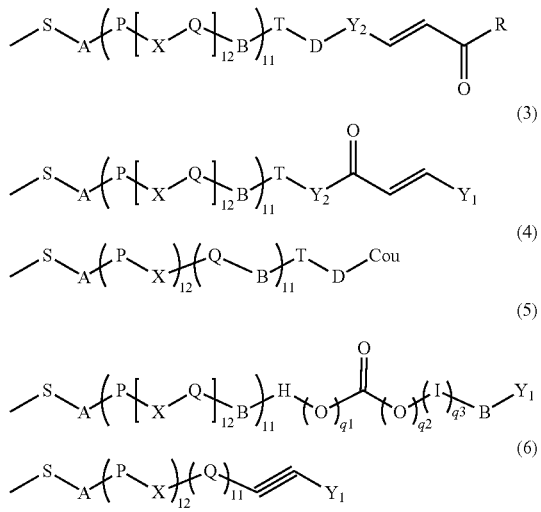

[in the formulae, A, B, and D each independently represent a single bond, —O—, —CH$_2$—, —COO—, —OCO—, —CONH—, —NH—CO—, —CH=CH—CO—O—, or —O—CO—CH=CH—;

S represents an alkylene group having 1 to 12 carbon atoms, and a hydrogen atom bonded thereto may be replaced with a halogen group;

T represents a single bond or an alkylene group having 1 to 12 carbon atoms, and a hydrogen atom bonded thereto may be replaced with a halogen group;

Y$_1$ represents a ring selected from a monovalent benzene ring, a naphthalene ring, a biphenyl ring, a furan ring, a pyrrole ring, and an alicyclic hydrocarbon having 5 to 8 carbon atoms, or a group in which the same or different two to six rings selected from the substituents are bonded through a bonding group B, and hydrogen atoms bonded thereto may be each independently substituted with —COOR$_0$ (in the formula, R$_0$ represents a hydrogen atom or an alkyl group having 1 to 5 carbon atoms), —NO$_2$, —CN, —CH=C(CN)$_2$, —CH=CH—CN, a halogen group, an alkyl group having 1 to 5 carbon atoms, or an alkyloxy group having 1 to 5 carbon atoms;

Y$_2$ represents a group selected from the group consisting of a divalent benzene ring, a naphthalene ring, a biphenyl ring, a furan ring, a pyrrole ring, an alicyclic hydrocarbon having 5 to 8 carbon atoms, and a combination thereof, and hydrogen atoms bonded thereto may be each independently substituted with —NO$_2$, —CN, —CH=C(CN)$_2$, —CH=CH—CN, a halogen group, an alkyl group having 1 to 5 carbon atoms, or an alkyloxy group having 1 to 5 carbon atoms;

R represents a hydroxy group, an alkoxy group having 1 to 6 carbon atoms, or the same definition as Y$_1$;

X represents a single bond, —COO—, —OCO—, —N=N—, —CH=CH—, —C≡C—, —CH=CH—CO—O—, or —O—CO—CH=CH—, and when the number of X is 2, these Xs may be the same or different;

Cou represents a coumarin-6-yl group or a coumarin-7-yl group, and hydrogen atoms bonded thereto may be each independently substituted with NO$_2$, —CN, —CH=C(CN)$_2$, —CH=CH—CN, a halogen group, an alkyl group having 1 to 5 carbon atoms, or an alkyloxy group having 1 to 5 carbon atoms;

one of q1 and q2 is 1, and the other is 0;

q3 is 0 or 1;

P and Q each independently represent a group selected from the group consisting of a divalent benzene ring, a naphthalene ring, a biphenyl ring, a furan ring, a pyrrole ring, an alicyclic hydrocarbon having 5 to 8 carbon atoms, and a combination thereof, and when X is CH=CH—CO—O— or —O—CO—CH=CH—, P or Q on a side to which —CH=CH— is bonded is an aromatic ring;

l1 represents 0 or 1;

l2 represents an integer of 0 to 2;

when both l1 and l2 are 0, A also represents a single bond when T is a single bond;

when l1 is 1, B also represents a single bond when T is a single bond; and

H and I each independently represent a group selected from a divalent benzene ring, a naphthalene ring, a biphenyl ring, a furan ring, a pyrrole ring, and a combination thereof].

<5> In any one of <1> to <4> described above, the component (A) preferably has one or more liquid crystalline side chains selected from the group consisting of the following formulae (21) to (33):

[in the formulae, A, B, q1, and q2 have the same definitions as above;

Y$_3$ is a group selected from the group consisting of a monovalent benzene ring, a naphthalene ring, a biphenyl ring, a furan ring, a nitrogen-containing heterocyclic ring, an alicyclic hydrocarbon having 5 to 8 carbon atoms, and a combination thereof, and hydrogen atoms bonded thereto may be each independently substituted with —NO$_2$, —CN, a halogen group, an alkyl group having 1 to 5 carbon atoms, or an alkyloxy group having 1 to 5 carbon atoms;

R$_3$ represents a hydrogen atom, —NO$_2$, —CN, —CH=C(CN)$_2$, —CH=CH—CN, a halogen group, a monovalent benzene ring, a naphthalene ring, a biphenyl ring, a furan ring, a nitrogen-containing heterocyclic ring, an alicyclic hydrocarbon having 5 to 8 carbon atoms, an alkyl group having 1 to 12 carbon atoms, or an alkoxy group having 1 to 12 carbon atoms;

l represents an integer of 1 to 12, and m represents an integer of 0 to 2, provided that the sum of all ms in the formulae (25) and (26) is 2 or more, the sum of all ms in the formulae (27), (28), (32), and (33) is 1 or more, and m1, m2, and m3 each independently represent an integer of 1 to 3;

R$_2$ represents a hydrogen atom, —NO$_2$, —CN, a halogen group, a monovalent benzene ring, a naphthalene ring, a biphenyl ring, a furan ring, a nitrogen-containing heterocyclic ring, an alicyclic hydrocarbon having 5 to 8 carbon atoms, an alkyl group, or an alkyloxy group; and Z$_1$ and Z$_2$ each represent a single bond, —CO—, —CH$_2$O—, —CH=N—, or —CF$_2$—].

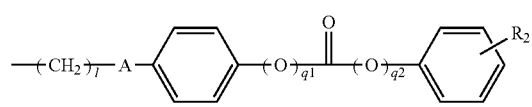

(21)

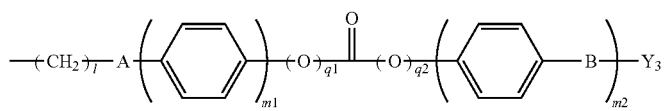
(22)

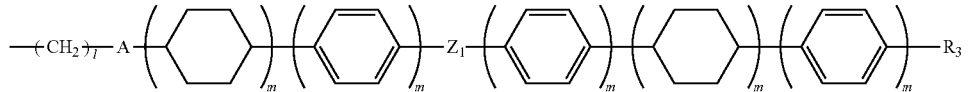
(23)

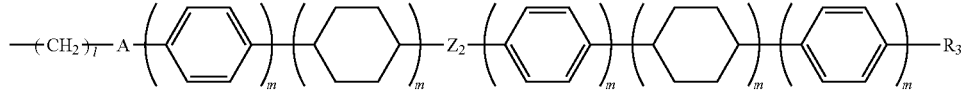
(24)

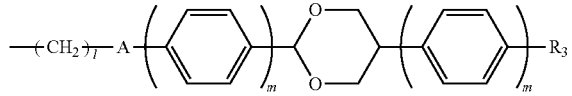
(25)

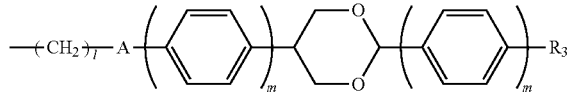
(26)

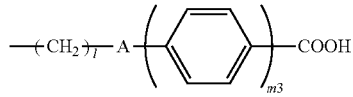
(27)

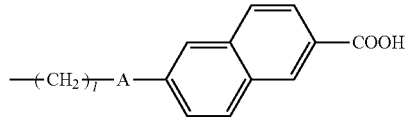
(28)

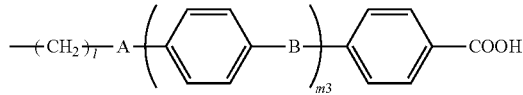
(29)

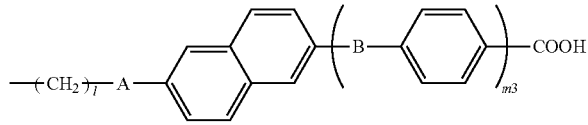
(30)

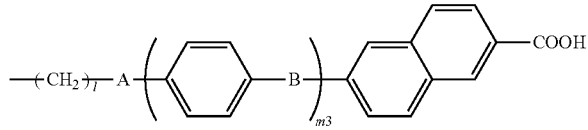
(31)

<6> A method for producing a substrate including a liquid crystal alignment film having an alignment control ability, wherein the liquid crystal alignment film is obtained by a method including:

[I] a step of applying the polymer composition according to any one of <1> to <5> described above onto a substrate having an electrode for driving a liquid crystal to form a coating film;

[II] a step of irradiating the coating film obtained in [I] with polarized ultraviolet light in an oblique direction; and

[III] a step of heating the coating film obtained in [II].

<7> A substrate having the liquid crystal alignment film produced by the method according to <6> described above.

<8> A twisted nematic type liquid crystal display element and a vertical electric field type liquid crystal display element having the substrate according to <7> described above.

<9> A method for producing a twisted nematic type liquid crystal display element and a vertical electric field type liquid crystal display element, wherein the liquid crystal display elements are obtained by a method comprising:

a step of preparing the substrate (first substrate) according to <7> described above;

a step of obtaining a second substrate including a liquid crystal alignment film having alignment control ability in which the liquid crystal alignment film is obtained by a method including

[I'] applying the polymer composition according to any one of <1> to <5> described above on a second substrate to form a coating film,

[II'] a step of irradiating the coating film obtained in [I'] with polarized ultraviolet light, and

[III'] a step of heating the coating film obtained in [II']; and

[IV] a step of obtaining a liquid crystal display element by arranging the first substrate and the second substrate to oppose each other such that the liquid crystal alignment films of the first substrate and the second substrate face each other through liquid crystal and exposure directions of liquid crystal alignment are orthogonal to each other.

<10> A twisted nematic type liquid crystal display element and a vertical electric field type liquid crystal display element produced by the method according to <9> described above.

<11> A side chain type polymer which is a photosensitive side chain type polymer exhibiting liquid crystallinity in a predetermined temperature range and has a repeating unit containing a vertically alignable group.

Effects of the Invention

According to the present invention, a substrate including a liquid crystal alignment film to which alignment control ability is imparted highly efficiently and which is excellent in tilt angle characteristics and a twisted nematic liquid crystal display element and a vertical electric field type liquid crystal display element including the substrate can be provided.

Since alignment control ability is highly efficiently imparted to the twisted nematic type liquid crystal display element and the vertical electric field type liquid crystal display element provided by the method of the present invention, the display characteristics are not impaired even if the liquid crystal display element is continuously driven for a long time.

EMBODIMENTS FOR CARRYING OUT THE INVENTION

As a result of intensive research, the present inventors have completed the present invention with the following findings.

The polymer composition used in the production method of the present invention has a photosensitive side chain type polymer capable of developing liquid crystallinity (hereinafter also referred to simply as a side chain type polymer), and a coating film obtained by using the polymer composition is a film having a photosensitive side chain type polymer capable of developing liquid crystallinity. The coating film is subjected to an alignment treatment by emitting polarized light in an oblique direction without performing a rubbing treatment. Then, after irradiation with polarized light, the side chain type polymer film is heated to form a coating film (hereinafter also referred to as a liquid crystal alignment film) to which alignment control ability is imparted. At this time, slight anisotropy developed by the irradiation with polarized light becomes a driving force, and the liquid crystalline side chain type polymer itself is efficiently realigned by self-assembly. As a result, highly efficient alignment treatment can be realized as a liquid crystal alignment film, and a liquid crystal alignment film provided with high alignment control ability can be obtained.

Embodiments of the present invention will be described in detail below.
<Method for Producing Substrate Including Liquid Crystal Alignment Film> and <Method for Producing Liquid Crystal Display Element>

The method for producing a substrate including a liquid crystal alignment film of the present invention includes:

[I] a step of applying a polymer composition comprising (A) a photosensitive side chain type polymer developing liquid crystallinity in a predetermined temperature range and having a repeating unit containing a vertically alignable group, and (B) an organic solvent on a substrate having electrodes for driving a liquid crystal to form a coating film;

[II] a step of irradiating the coating film obtained in [I] with polarized ultraviolet light in an oblique direction, and

[III] a step of heating the coating film obtained in [II].

Through the above steps, it is possible to obtain a liquid crystal alignment film provided with alignment control ability and a substrate having the liquid crystal alignment film.

The method for producing a twisted nematic type liquid crystal display element and a vertical electric field type liquid crystal display element includes:

[IV] a step of obtaining a liquid crystal display element by arranging the first substrate and the second substrate obtained as described above to oppose each other such that the liquid crystal alignment films of the first substrate and the second substrate face each other through liquid crystal. Thus, a twisted nematic type liquid crystal display element and a vertical electric field type liquid crystal display element can be obtained.

Hereinafter, each step of [I] to [III] and [IV] of the production method of the present invention will be described.
<Step [I]>

In step [I], a coating film is formed by applying a polymer composition comprising a photosensitive side chain type polymer developing liquid crystallinity in a predetermined temperature range and further including a side chain having a vertically alignable group, and an organic solvent on a substrate including electrodes for driving a liquid crystal.
<Substrate>

The substrate is not particularly limited, but in the case where the liquid crystal display element to be produced is of a transmission type, it is preferable to use a substrate having high transparency. In this case, a glass substrate, a plastic substrate such as an acrylic substrate or a polycarbonate substrate, or the like can be used without particular limitation.

For an electrode for driving the liquid crystal, ITO (indium tin oxide), IZO (indium zinc oxide), or the like is preferable. In the case of a reflection type liquid crystal display element, an opaque object such as a silicon wafer can be used for the substrate if the substrate is only on one side, and, in this case, a material that reflects light such as aluminum can also be used for the electrodes.

As a method for forming electrodes on the substrate, conventionally known methods can be used.
<Polymer Composition>

A polymer composition is applied on the side of the substrate on which the electrodes are formed.

In the production method of the present invention, the following polymerizable composition according to the present invention is used. That is, as described above, the polymer composition of the present invention comprises (A) a side chain type polymer which is a photosensitive side chain type polymer exhibiting liquid crystallinity in a predetermined temperature range and has a repeating unit containing a vertically alignable group, and (B) an organic solvent.

<<(A) Side Chain Type Polymer>>

The component (A) is a photosensitive side chain type polymer that develops liquid crystallinity in a predetermined temperature range, and further has a side chain including a vertically alignable group.

The (A) side chain type polymer preferably reacts by light in a wavelength range of 250 nm to 400 nm and exhibits liquid crystallinity in a temperature range of 100° C. to 300° C.

The (A) side chain type polymer preferably has a photosensitive side chain reactive to light in a wavelength range of 250 nm to 400 nm.

The (A) side chain type polymer preferably has a mesogenic group in order to exhibit liquid crystallinity in a temperature range of 100° C. to 300° C.

In the (A) side chain type polymer, a side chain having photosensitivity is bonded to the main chain, and a crosslinking reaction, an isomerization reaction, or photo-Fries rearrangement can be caused in response to light. The structure of the side chain having photosensitivity is not particularly limited, but a structure that causes a crosslinking reaction or photo-Fries rearrangement in response to light is desirable, and a structure that causes a crosslinking reaction is more desirable. In this case, even if the side chain type polymer is exposed to external stress such as heat, the achieved alignment control ability can be stably maintained for a long time. The structure of the photosensitive side chain type polymer film capable of developing liquid crystallinity is not particularly limited as long as the film satisfies such characteristics, but it is preferable that the side chain structure includes a rigid mesogenic component. In this case, stable liquid crystal alignment can be obtained when the side chain type polymer is used as a liquid crystal alignment film.

The (A) side chain type polymer has a repeating unit containing a vertically alignable group, thereby giving a liquid crystal alignment film that develops a desired tilt angle. This is considered to be because, when used as a liquid crystal alignment film, the side chain type polymer clings to the vertically alignable group, thereby developing anisotropy and obtaining a tilt angle.

The structure of the polymer may be, for example, a structure including a main chain and a side chain bonded thereto in which the side chain includes a mesogenic component such as a biphenyl group, a terphenyl group, a phenylcyclohexyl group, a phenylbenzoate group, or an azobenzene group, and a photosensitive group which is bonded to an end portion thereof and undergoes a crosslinking reaction or an isomerization reaction in response to light, or a structure including a main chain and a side chain bonded thereto in which side chain includes a phenylbenzoate group that serves as a mesogenic component and undergoes a photo-Fries rearrangement reaction.

As a more specific example of the photosensitive side chain type polymer that can develop liquid crystallinity, the side chain type polymer preferably has a structure including a main chain constituted by at least one selected from the group consisting of radically polymerizable groups such as hydrocarbon, (meth)acrylate, itaconate, fumarate, maleate, α-methylene-γ-butyrolactone, styrene, vinyl, maleimide, and norbornene and siloxane, a vertically alignable group, and a photosensitive side chain.

(Photosensitive Side Chain)

Here, the photosensitive side chain is preferably a side chain constituted by at least one of the following formulae (1) to (6).

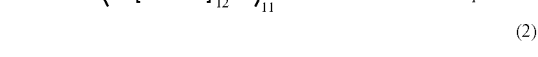

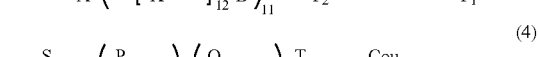

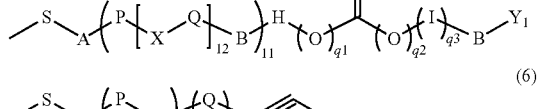

In the formulae, A, B, and D each independently represent a single bond, —O—, —CH$_2$—, —COO—, —OCO—, —CONH—, —NH—CO—, —CH=CH—CO—O—, or —O—CO—CH=CH—;

S represents an alkylene group having 1 to 12 carbon atoms, and a hydrogen atom bonded thereto may be replaced with a halogen group;

T represents a single bond or an alkylene group having 1 to 12 carbon atoms, and a hydrogen atom bonded thereto may be replaced with a halogen group;

Y$_1$ represents a ring selected from a monovalent benzene ring, a naphthalene ring, a biphenyl ring, a furan ring, a pyrrole ring, and an alicyclic hydrocarbon having 5 to 8 carbon atoms, or a group in which the same or different two to six rings selected from the substituents are bonded through a bonding group B, and hydrogen atoms bonded thereto may be each independently substituted with —COOR$_0$ (in the formula, R$_0$ represents a hydrogen atom or an alkyl group having 1 to 5 carbon atoms), —NO$_2$, —CN, —CH=C(CN)$_2$, —CH=CH—CN, a halogen group, an alkyl group having 1 to 5 carbon atoms, or an alkyloxy group having 1 to 5 carbon atoms;

Y$_2$ represents a group selected from the group consisting of a divalent benzene ring, a naphthalene ring, a biphenyl ring, a furan ring, a pyrrole ring, an alicyclic hydrocarbon having 5 to 8 carbon atoms, and a combination thereof, and hydrogen atoms bonded thereto may be each independently substituted with —NO$_2$, —CN, —CH=C(CN)$_2$, —CH=CH—CN, a halogen group, an alkyl group having 1 to 5 carbon atoms, or an alkyloxy group having 1 to 5 carbon atoms;

R represents a hydroxy group, an alkoxy group having 1 to 6 carbon atoms, or the same definition as Y$_1$;

X represents a single bond, —COO—, —OCO—, —N=N—, —CH=CH—, —C≡C—, —CH=CH—CO—

O—, or —O—CO—CH=CH—, and when the number of X is 2, these Xs may be the same or different;

Cou represents a coumarin-6-yl group or a coumarin-7-yl group, and hydrogen atoms bonded thereto may be each independently substituted with $NO_2$, —CN, —CH=C(CN)$_2$, —CH=CH—CN, a halogen group, an alkyl group having 1 to 5 carbon atoms, or an alkyloxy group having 1 to 5 carbon atoms;

one of q1 and q2 is 1, and the other is 0;

q3 is 0 or 1;

P and Q each independently represent a group selected from the group consisting of a divalent benzene ring, a naphthalene ring, a biphenyl ring, a furan ring, a pyrrole ring, an alicyclic hydrocarbon having 5 to 8 carbon atoms, and a combination thereof, and when X is CH=CH—CO—O— or —O—CO—CH=CH—, P or Q on a side to which —CH=CH— is bonded is an aromatic ring;

l1 represents 0 or 1;

l2 represents an integer of 0 to 2;

when both l1 and l2 are 0, A also represents a single bond when T is a single bond;

when l1 is 1, B also represents a single bond when T is a single bond; and

H and I each independently represent a group selected from a divalent benzene ring, a naphthalene ring, a biphenyl ring, a furan ring, a pyrrole ring, and a combination thereof.

In addition, the side chain may be one or a plurality of photosensitive side chains selected from the group consisting of the following formulae (7) to (10).

In the formulae, A, B, D, $Y_1$, X, $Y_2$, and R have the same definition as above;

l represents an integer from 1 to 12;

m represents an integer of 0 to 2, and m1 and m2 each represent an integer of 1 to 3;

n represents an integer of 0 to 12 (provided that B represents a single bond when n=0).

The side chain is preferably one or a plurality of photosensitive side chains selected from the group consisting of the following formulae (11) to (13).

In the formulae, A, X, l, m, and R have the same definitions as above.

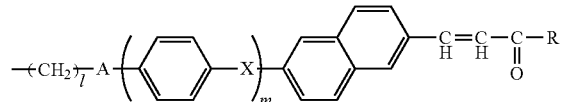

(11)

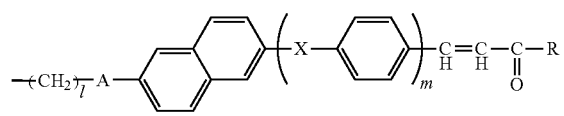

(12)

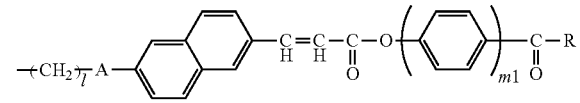

(13)

The side chain is preferably a photosensitive side chain represented by the following formula (14) or (15).

In the formulae, A, $Y_1$, X, l, m1, and m2 have the same definitions as above.

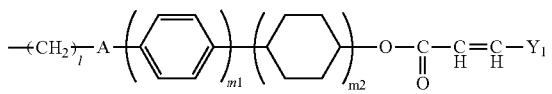

(14)

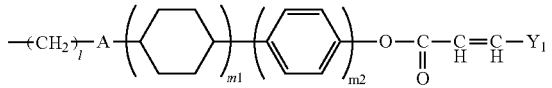

(15)

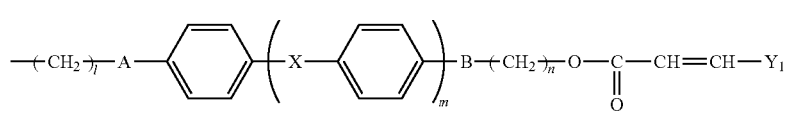

(7)

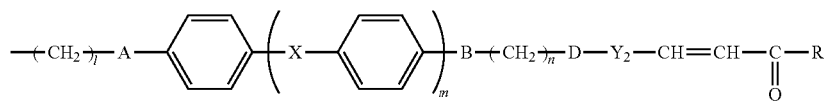

(8)

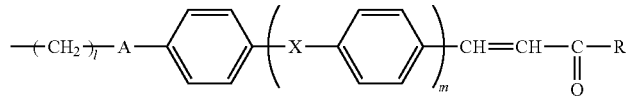

(9)

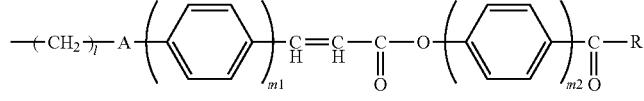

(10)

The side chain is preferably a photosensitive side chain represented by the following formula (16) or (17).

In the formulae, A, X, l, and m have the same definitions as above.

(16)

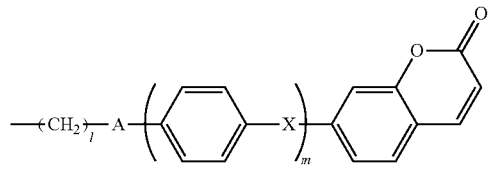
(17)

In addition, the side chain is preferably a photosensitive side chain represented by the following formula (18) or (19).

In the formulae, A, B, $Y_1$, q1, q2, m1, and m2 have the same definitions as above.

$R_1$ represents a hydrogen atom, $-NO_2$, $-CN$, $-CH=C(CN)_2$, $-CH=CH-CN$, a halogen group, an alkyl group having 1 to 5 carbon atoms, or an alkyloxy group having 1 to 5 carbon atoms.

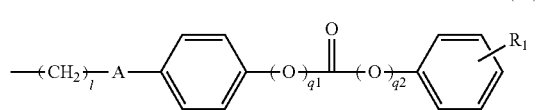
(18)

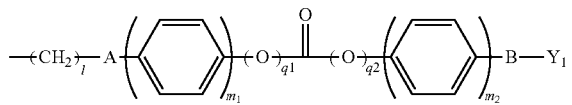
(19)

The side chain is preferably a photosensitive side chain represented by the following formula (20).

In the formula, A, $Y_1$, X, l, and m have the same definitions as above.

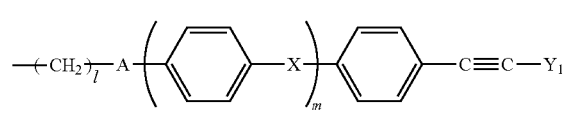
(20)

From the viewpoint of solubility in a solvent, the sum of the number of benzene rings and the number of naphthalene rings connected by a single bond in the photoalignable side chain is preferably 3 or less, and the terminal end is preferably COOH or $CONH_2$.

Further, in view of easy application of anisotropy by irradiation with polarized ultraviolet light in an oblique direction, in the process described in the present application, the photoalignable side chain is preferably a group that develops anisotropy in a direction parallel to the irradiation direction of the polarized ultraviolet light.

(Vertically Alignable Group)

In addition, although the vertically alignable group is not particularly limited, the vertically alignable group is preferably a group containing a hydrocarbon group having 1 to 17 carbon atoms, and specifically, a group represented by the formula (v) is preferable.

(v)

In the formula (v), $Y^1$ represents a single bond or a bonding group selected from $-O-$, $-CH_2O-$, $-COO-$, $-OCO-$, $-NHCO-$, $-NH-CO-O-$ and $-NH-CO-NH-$;

$Y^2$ represents a single bond, an alkylene group having 1 to 15 carbon atoms, a $-CH_2-CH(OH)-CH_2-$group, or a divalent cyclic group selected from a benzene ring, a cyclohexane ring, and a heterocyclic ring;

an arbitrary hydrogen atom on the cyclic group may be substituted with Z;

$Y^3$ represents a single bond or an alkylene group having 1 to 15 carbon atoms;

$Y^4$ represents a single bond, a divalent cyclic group selected from a benzene ring, a cyclohexane ring or a heterocyclic ring, or a divalent organic group having a steroid skeleton having 17 to 30 carbon atoms;

an arbitrary hydrogen atom on the cyclic group may be substituted with Z;

$Y^5$ represents a divalent cyclic group selected from a benzene ring, a cyclohexane ring or a heterocyclic ring;

any hydrogen atom of these cyclic groups may be substituted with Z;

m represents an integer of 0 to 4, and when m is 2 or more, $Y^5$s may be the same as or different from each other;

$Y^6$ represents a hydrogen atom, an alkyl group having 1 to 17 carbon atoms, a fluorinated alkyl group having 1 to 17 carbon atoms, an alkoxy group having 1 to 17 carbon atoms, or a fluorinated alkoxy group having 1 to 17 carbon atoms; and Z represents an alkyl group having 1 to 3 carbon atoms, an alkoxy group having 1 to 3 carbon atoms, a fluorinated alkyl group having 1 to 3 carbon atoms, a fluorinated alkoxy group having 1 to 3 carbon atoms, or a fluorine atom, wherein the alkylene group, the alkyl group, the fluorinated alkyl group, the alkoxy group, and the fluorinated alkoxy group may include therein 1 to 3 of the bonding groups described above as long as the bonding groups are not adjacent to each other, and in $Y^2$ to $Y^6$, an alkylene group, a $-CH_2-CH(OH)-CH_2-$ group, a divalent cyclic group, a divalent organic group having a steroid skeleton, an alkyl group, and an fluorinated alkyl group may be bonded to a group adjacent thereto via the bonding group described above. However, the total number of carbon atoms of the substituents represented by $Y^2$ to $Y^6$ is 1 to 30.

Examples of the alkylene group having 1 to 15 carbon atoms include a divalent group obtained by removing one hydrogen atom from an alkyl group having 1 to 15 carbon atoms among alkyl groups having 1 to 17 carbon atoms that will be described later, and specific examples thereof include methylene, ethylene, propylene, trimethylene, tetramethylene, pentamethylene, hexamethylene, heptamethylene, and octamethylene groups.

Specific examples of the heterocyclic ring include a pyrrole ring, an imidazole ring, an oxazole ring, a thiazole ring, a pyrazole ring, a pyridine ring, a pyrimidine ring, a quinoline ring, a pyrazoline ring, an isoquinoline ring, a carbazole ring, a purine ring, a thiadiazole ring, a pyridazine ring, a pyrazoline ring, a triazine ring, a pyrazolidine ring, a triazole ring, a pyrazine ring, a benzimidazole ring, a cinnoline ring, a phenanthroline ring, an indole ring, a quinoxaline ring, a benzothiazole ring, a phenothiazine ring, an oxadiazole ring, and an acridine ring. Among these, a pyrrole ring, an imidazole ring, a pyrazole ring, a pyridine ring, a pyrimidine ring, a pyrazoline ring, a carbazole ring, a pyridazine ring, a pyrazoline ring, a triazine ring, a pyrazolidine ring, a triazole ring, a pyrazine ring, and a benzimidazole ring are preferable.

Specific examples of the divalent organic group having a steroid skeleton having 17 to 30 carbon atoms include a divalent organic group having a structure obtained by removing two hydrogen atoms from a structure selected from cholesteryl, androsteryl, β-cholesteryl, epiandrosteryl, ergosteryl, esteryl, 11α-hydroxymethylsteryl, 11α-progesteryl, lanosteryl, melatonyl, methyl testosteryl, norethisteryl, pregnenoronyl, β-sitosteryl, stigmasteryl, testosteryl, and cholesterol acetate ester, and more specific examples thereof include, but not limited to, divalent organic groups shown below.

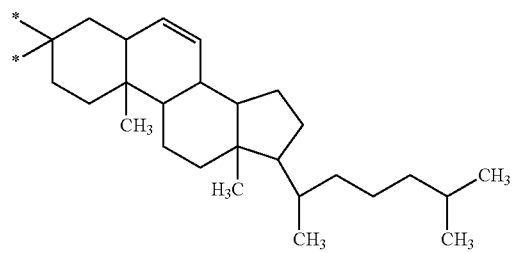

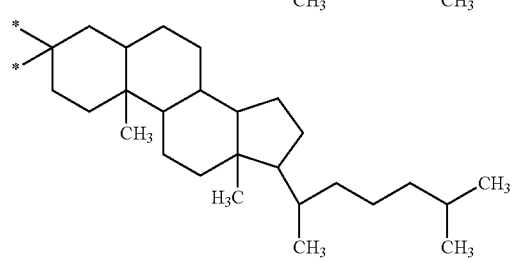

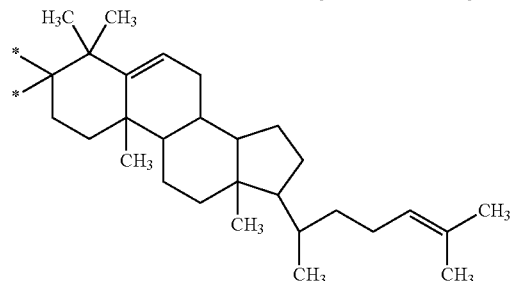

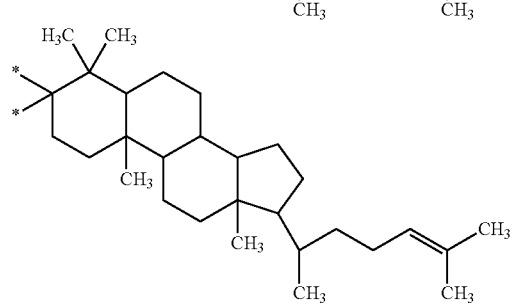

-continued

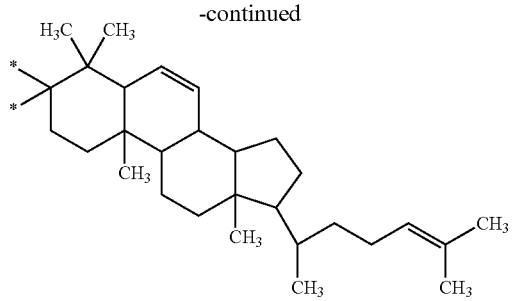

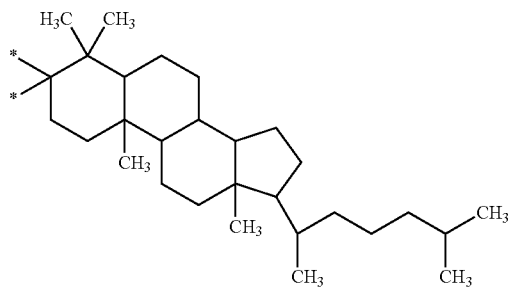

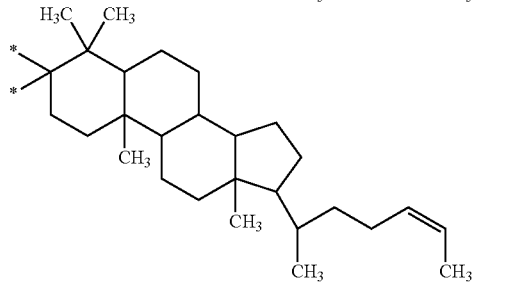

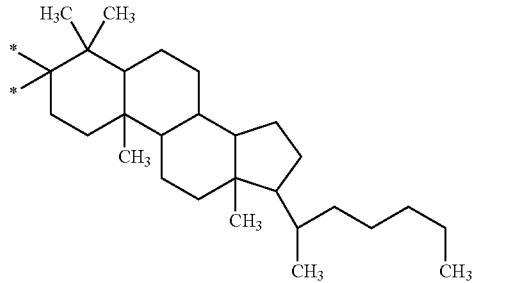

(In the formulae, * represents a bonding position.)

Examples of the alkyl group having 1 to 17 carbon atoms include, in addition to the alkyl groups exemplified above for the number of carbons of 1 to 6, n-heptyl, 1-methyl-n-hexyl, 2-methyl-n-hexyl, 3-methyl-n-hexyl, 1,1-dimethyl-n-pentyl, 1,2-dimethyl-n-pentyl, 1,3-dimethyl-n-pentyl, 2,2-dimethyl-n-pentyl, 2,3-dimethyl-n-pentyl, 3,3-dimethyl-n-pentyl, 1-ethyl-n-pentyl, 2-ethyl-n-pentyl, 3-ethyl-n-pentyl, 1-methyl-1-ethyl-n-butyl, 1-methyl-2-ethyl-n-butyl, 2-methyl-2-ethyl-n-butyl, 2-ethyl-3-methyl-n-butyl, n-octyl, 1-methyl-n-heptyl, 2-methyl-n-heptyl, 3-methyl-n-heptyl, 1,1-dimethyl-n-hexyl, 1,2-dimethyl-n-hexyl, 1,3-dimethyl-n-hexyl, 2,2-dimethyl-n-hexyl, 2,3-dimethyl-n-hexyl, 3,3-dimethyl-n-hexyl, 1-ethyl-n-hexyl, 2-ethyl-n-hexyl, 3-ethyl-n-hexyl, 1-methyl-1-ethyl-n-pentyl, 1-methyl-2-ethyl-n-pentyl, 1-methyl-3-ethyl-n-pentyl, 2-methyl-2-ethyl-n-pentyl, 2-methyl-3-ethyl-n-pentyl, 3-methyl-3-ethyl-n-pentyl, n-nonyl, n-decyl, n-undecyl, n-dodecyl, n-tridecyl, n-tetradecyl, n-pentadecyl, n-hexadecyl, and n-heptadecyl.

Examples of the fluorinated alkyl group having 1 to 17 carbon atoms include groups obtained by substituting at least one hydrogen atom of the above alkyl groups having 1 to 17 carbon atoms with a fluorine atom, and specific examples thereof include fluoromethyl, difluoromethyl, trifluoromethyl, pentafluoroethyl, 2,2,2-trifluoroethyl, heptafluoropropyl, 2,2,3,3,3-pentafluoropropyl, 2,2,3,3-tetrafluoropropyl, 2,2,2-trifluoro-1-(trifluoromethyl)ethyl, nonafluorobutyl, 4,4,4-trifluorobutyl, undecafluoropentyl, 2,2,3,3,4,4,5,5,5-nonafluoropentyl, 2,2,3,3,4,4,5,5-octafluoropentyl, tridecafluorohexyl, 2,2,3,3,4,4,5,5,6,6,6-undecafluorohexyl, 2,2,3,3,4,4,5,5,6,6-decafluorohexyl, and 3,3,4,4,5,5,6,6,6-nonafluorohexyl.

Specific examples of the fluorinated alkoxy group having 1 to 17 carbon atoms include group in which an oxygen atom (—O—) is bonded to the above-mentioned fluorinated alkyl groups having 1 to 17 carbon atoms, and specific examples thereof include fluoromethoxy, difluoromethoxy, trifluoromethoxy, pentafluoroethoxy, 2,2,2-trifluoroethoxy, heptafluoropropoxy, 2,2,3,3,3-pentafluoropropoxy, 2,2,3,3-tetrafluoropropoxy, 2,2,2-trifluoro-1-(trifluoromethyl)ethoxy, nonafluorobutoxy, 4,4,4-trifluorobutoxy, undecafluoropentyloxy, 2,2,3,3,4,4,5,5,5-nonafluoropentyloxy, 2,2,3,3,4,4,5,5-octafluoropentyloxy, tridecafluorohexyloxy, 2,2,3,3,4,4,5,5,6,6,6-undecafluorohexyloxy, 2,2,3,3,4,4,5,5,6,6-decafluorohexyloxy, and 3,3,4,4,5,5,6,6,6-nonafluorohexyloxy groups.

Examples of the alkyl group having 1 to 3 carbon atoms in Z described above include groups having 1 to 3 carbon atoms among the groups exemplified above for 1 to 6 carbon atoms, examples of the alkoxy group having 1 to 3 carbon atoms include groups having 1 to 3 carbon atoms among the groups exemplified above for the alkoxy group having 1 to 6 carbon atoms, examples of the fluorinated alkyl group having 1 to 3 carbon atoms include groups having 1 to 3 carbon atoms among the groups exemplified above for the fluorinated alkyl group having 1 to 17 carbon atoms, and examples of the fluorinated alkoxy group having 1 to 3 carbon atoms include groups having 1 to 3 carbon atoms among the groups exemplified above for the fluorinated alkoxy group having 1 to 17 carbon atoms.

Among these, in view of, for example, ease of synthesis, $Y^1$ is preferably a single bond, $Y^2$ is preferably a benzene ring or a cyclohexane ring, $Y^3$ is preferably an alkylene group having 1 to 15 carbon atoms and more preferably an alkylene group having 1 to 9 carbon atoms, $Y^4$ is preferably a benzene ring, a cyclohexane ring, or a divalent organic group having a steroid skeleton having 17 to 30 carbon atoms, $Y^5$ is preferably a benzene ring or a cyclohexane ring, $Y^6$ is preferably an alkyl group having 1 to 17 carbon atoms, a fluorinated alkyl group having 1 to 10 carbon atoms, an alkoxy group having 1 to 17 carbon atoms, or a fluorinated alkoxy group having 1 to 10 carbon atoms, more preferably an alkyl group having 1 to 12 carbon atoms or an alkoxy group having 1 to 12 carbon atoms, and still more preferably an alkyl group having 1 to 9 carbon atoms or an alkoxy group having 1 to 9 carbon atoms.

However, when $Y^4$ is a divalent organic group having a steroid skeleton, $Y^6$ is preferably a hydrogen atom.

In addition, from the viewpoint of, for example, availability of raw material and ease of synthesis, m is preferably 0 to 3, more preferably 0 to 2, and still more preferably 0 or 1.

To be noted, the alkylene group, alkyl group, fluorinated alkyl group, alkoxy group, and fluorinated alkoxy group may have therein 1 to 3 of the above-described bonding groups as long as the bonding groups are not adjacent to each other, and, in $Y^2$ to $Y^6$, an alkylene group, a —$CH_2$—$CH(OH)$—$CH_2$— group, a divalent cyclic group, a divalent organic group having a steroid skeleton, an alkyl group, and a fluorinated alkyl group may be bonded to an adjacent group via the above-described bonding group.

The total number of carbon atoms of the substituent represented by each of $Y^2$ to $Y^6$ is 1 to 30 and preferably 1 to 20. In the case of having an alkyl group at the terminal end, the alkyl group at the terminal end is an alkyl group having 1 to 17 carbon atoms.

In addition to the above-described vertically alignable group (a-1), for example, a vertically alignable group (a-2) in which $Y^1$ to $Y^4$ described above are single bonds, m is 2 or 3, $Y^5$ is a benzene ring or cyclohexane ring, and $Y^6$ is an alkyl group having 1 to 17 carbon atoms can also be suitably used.

Specific examples of such a vertically alignable group (a-2) include, but are not limited to, groups represented by (a-2-1) to (a-2-7) below.

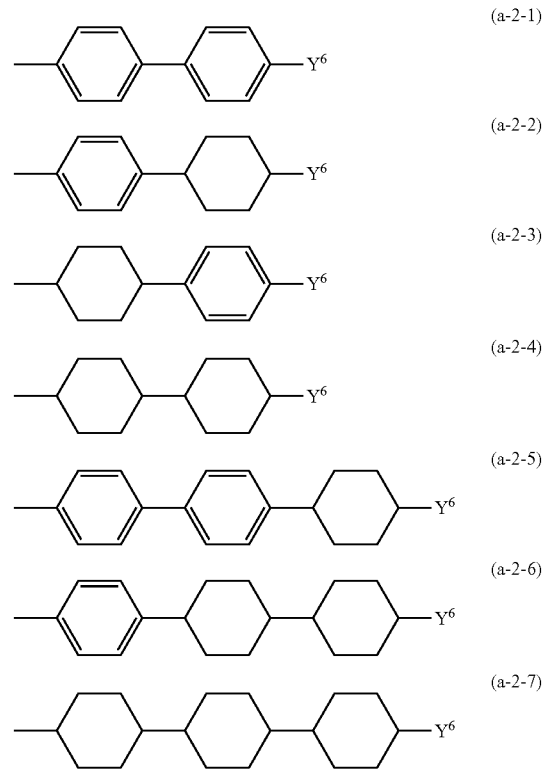

(In the formulae, $Y^6$ is the same definition as above).

Further, in addition to the above-described vertically alignable groups (a-1) and (a-2), for example, a vertically alignable group (a-3) in which $Y^1$ to $Y^3$ described above are single bonds, $Y^4$ is a divalent organic group having a steroid skeleton having 17 to 30 carbon atoms, m is 0, and $Y^6$ is a hydrogen atom can also be suitably used.

Examples of such a vertically alignable group (a-3) include, but are not limited to, groups represented (a-3-1) to (a-3-8) below.

(a-3-1)
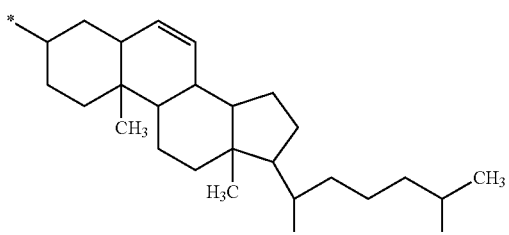

(a-3-2)
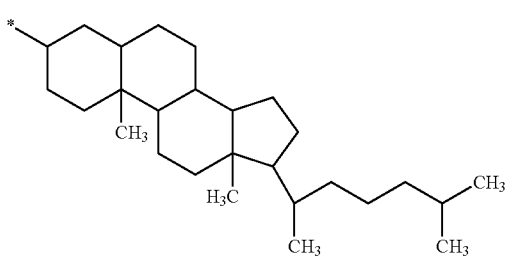

(a-3-3)
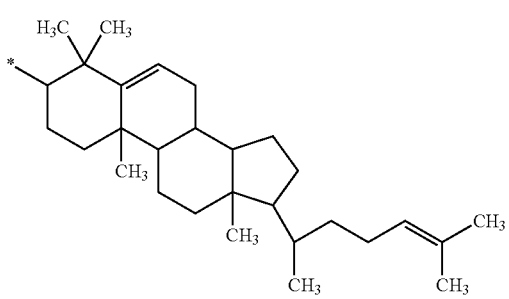

(a-3-4)
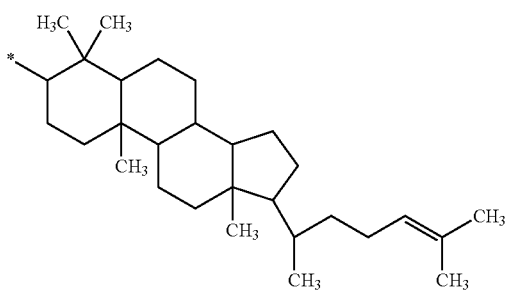

(a-3-5)
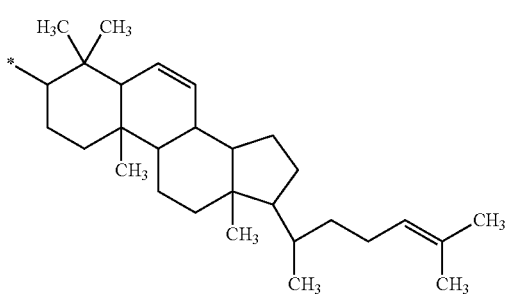

(a-3-6)
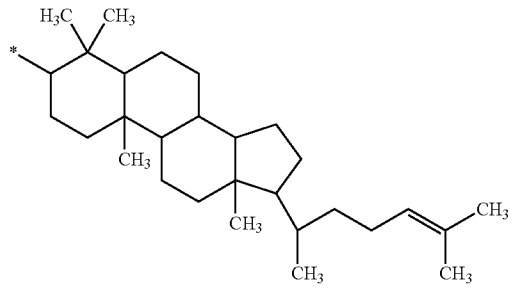

(a-3-7)
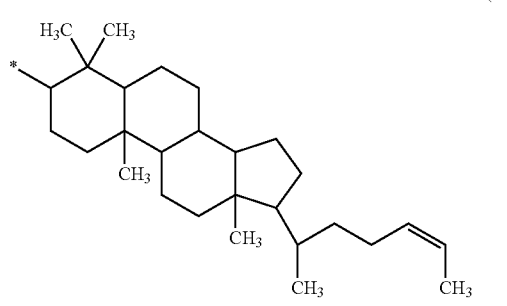

(a-3-8)
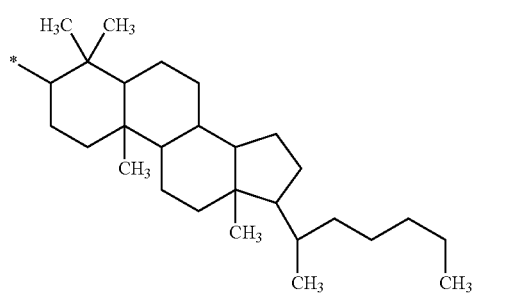

(In the formulae, * represents a bonding position.)

The vertically alignable group described above can be introduced into the polymer by using a monomer having an unsaturated double bond such as a (meth)acrylic monomer, a vinyl monomer, a styrene monomer, or a maleimide monomer having this, and also in this case, it is preferable that the vertically alignable group is introduced into the polymer by using the (meth)acrylic monomer having the vertically alignable group.

(Liquid Crystalline Side Chain)

The (A) side chain type polymer preferably has one or a plurality of liquid crystalline side chains selected from the group consisting of the following formulae (21) to (33).

In the formulae, A, B, q1, and q2 have the same definition as above;

$Y_3$ is a group selected from the group consisting of a monovalent benzene ring, a naphthalene ring, a biphenyl ring, a furan ring, a nitrogen-containing heterocyclic ring, an alicyclic hydrocarbon having 5 to 8 carbon atoms, and a combination thereof, and hydrogen atoms bonded thereto may be each independently substituted with —$NO_2$, —CN, a halogen group, an alkyl group having 1 to 5 carbon atoms, or an alkyloxy group having 1 to 5 carbon atoms;

$R_3$ represents a hydrogen atom, —$NO_2$, —CN, —CH=C(CN)$_2$, —CH=CH—CN, a halogen group, a monovalent benzene ring, a naphthalene ring, a biphenyl ring, a furan ring, a nitrogen-containing heterocyclic ring, an alicyclic hydrocarbon having 5 to 8 carbon atoms, an alkyl group having 1 to 12 carbon atoms, or an alkoxy group having 1 to 12 carbon atoms;

l represents an integer of 1 to 12, and m represents an integer of 0 to 2, provided that the sum of all ms in the formulae (25) and (26) is 2 or more, the sum of all ms in the formulae (27), (28), (32), and (33) is 1 or more, and m1, m2, and m3 each independently represent an integer of 1 to 3;

$R_2$ represents a hydrogen atom, —$NO_2$, —CN, a halogen group, a monovalent benzene ring, a naphthalene ring, a biphenyl ring, a furan ring, a nitrogen-containing heterocyclic ring, an alicyclic hydrocarbon having 5 to 8 carbon atoms, an alkyl group, or an alkyloxy group; and $Z_1$ and $Z_2$ each represent a single bond, —CO—, —$CH_2O$—, —CH=N—, or —$CF_2$—.

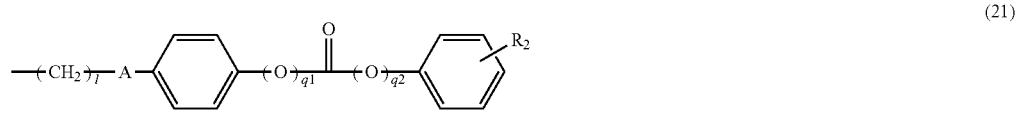
(21)

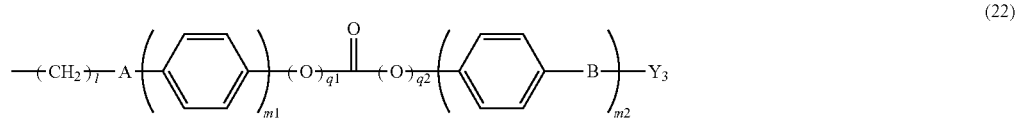
(22)

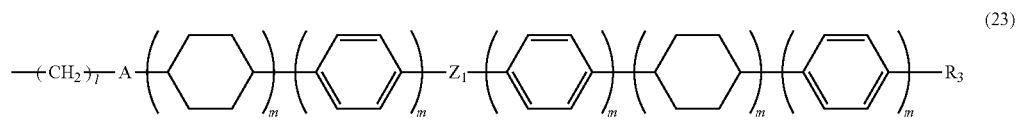
(23)

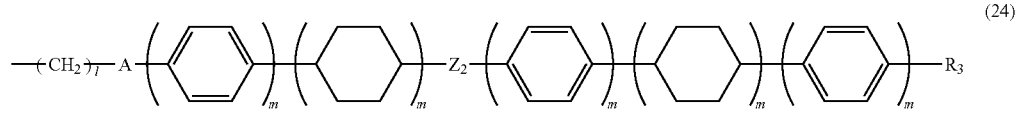
(24)

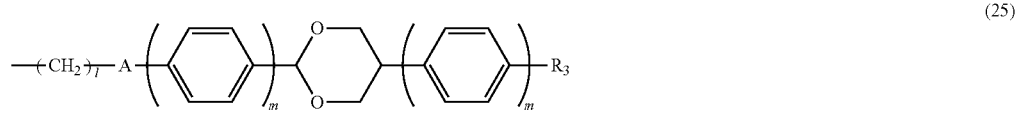
(25)

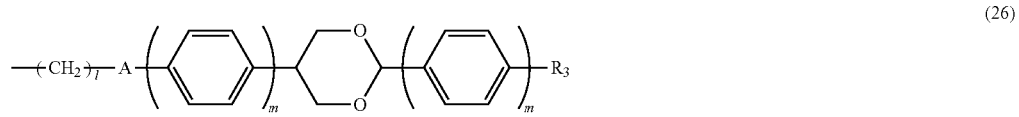
(26)

(27)

(28)

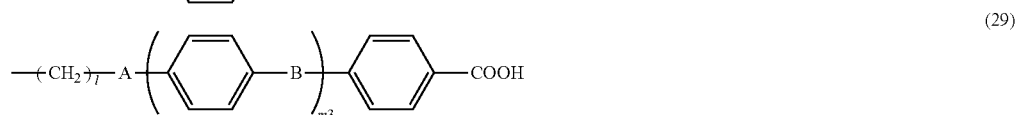
(29)

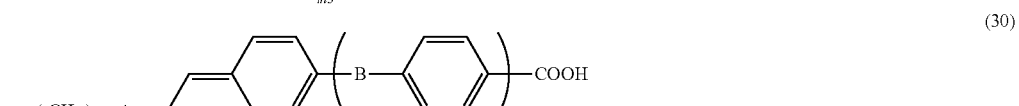
(30)

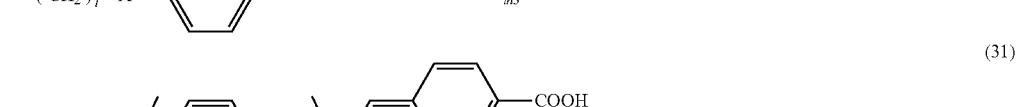
(31)

<<Preparation of Photosensitive Side Chain Type Polymer>>

The photosensitive side chain type polymer capable of developing liquid crystallinity described above can be obtained by polymerizing the photoreactive side chain monomer having the photosensitive side chain, the monomer having the vertically alignable group, and the liquid crystalline side chain monomer.

[Monomer Having Vertically Alignable Group]

Specific examples of the monomer include alkyl esters of (meth)acrylic acid, alkyl vinyl ether, 2-alkylstyrene, 3-alkylstyrene, 4-alkylstyrene, and N-alkylmaleimide in which the alkyl group has 1 to 20 carbon atoms.

These monomers can be produced by known methods, and some are available as commercial products.

In the case where a vertically alignable group is introduced into the polymer by using a (meth)acrylic monomer including the vertically alignable group represented by the above formula (v), the vertically alignable side chain thereof is represented by the following formula (v').

$$—COO—Y^1—Y^2—Y^3—Y^4\text{-}(Y^5)_m\text{-}Y^6 \quad (v')$$

(In the formula, $Y^1$, $Y^2$, $Y^3$, $Y^4$, $Y^5$, $Y^6$, and m have the same definitions as in the above formula (v).)

[Photoreactive Side Chain Monomer]

The photoreactive side chain monomer is a monomer which can form a polymer having a photosensitive side chain on a side chain portion of the polymer when the polymer is formed.

The photoreactive group in the side chain preferably has the following structure or a derivative thereof.

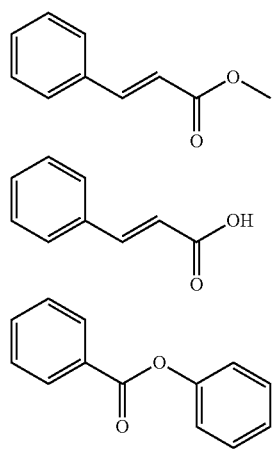

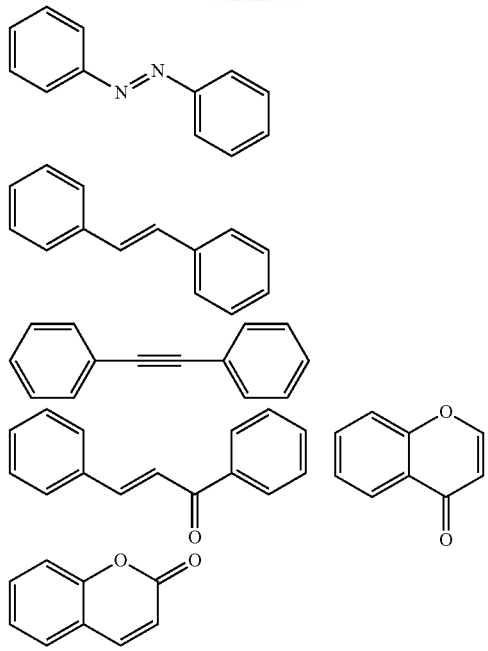

A more specific example of the photoreactive side chain monomer preferably has a structure including a polymerizable group constituted by at least one selected from the group consisting of radically polymerizable groups such as hydrocarbon, (meth)acrylate, itaconate, fumarate, maleate, α-methylene-γ-butyrolactone, styrene, vinyl, maleimido, and norbornene, and siloxane, and a photosensitive side chain constituted by at least one of the above formulae (1) to (6), preferably, for example, a photosensitive side chain constituted by at least one of the above formulae (7) to (10), a photosensitive side chain constituted by at least one of the above formulae (11) to (13), a photosensitive side chain represented by the above formula (14) or (15), a photosensitive side chain represented by the above formula (16) or (17), a photosensitive side chain represented by the above formula (18) or (19), or a photosensitive side chain represented by the above formula (20).

Examples of such a photoreactive side chain monomer include monomers selected from the following formulae M1-1 to M1-7 and M1-17 to M1-20.

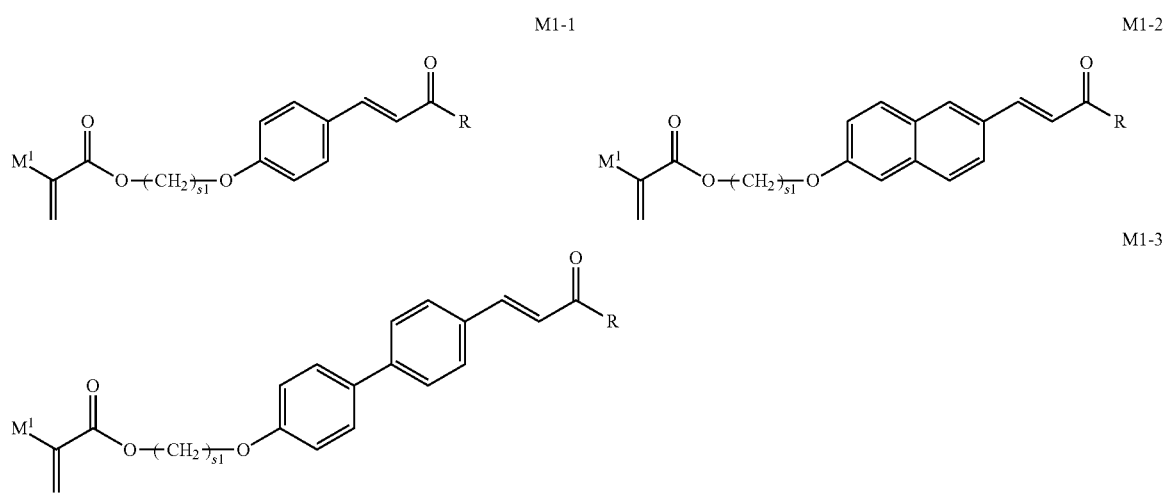

-continued

M1-4
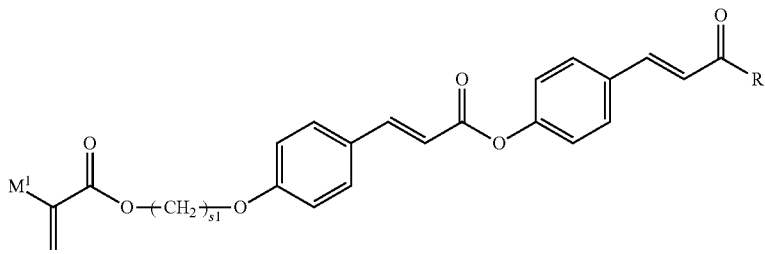

M1-5
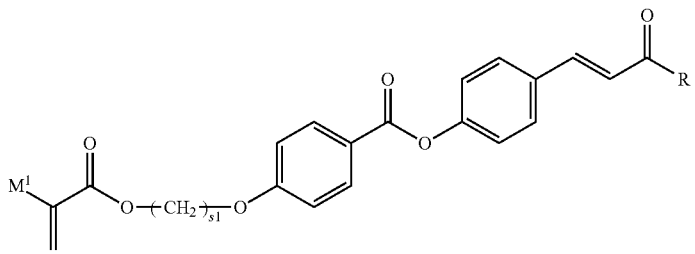

M1-6
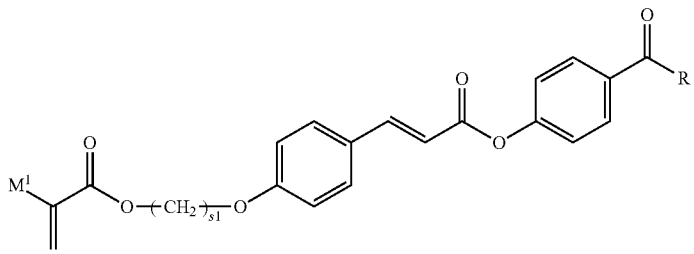

M1-7     M1-17
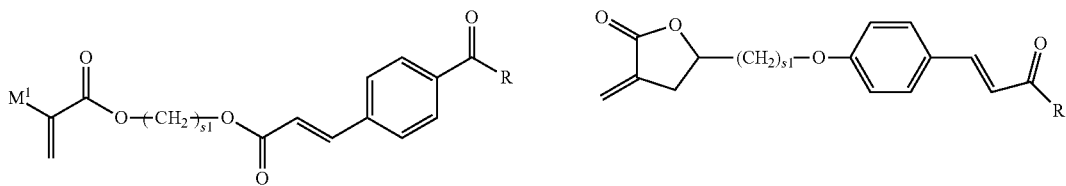

M1-18     M1-19
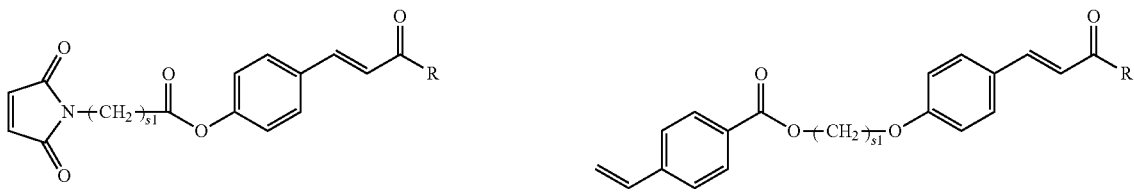

M1-20
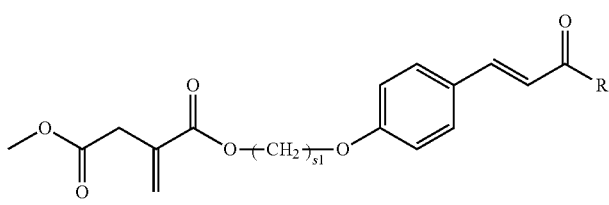

(In the formulae, R represents OH or NH$_2$, M1 represents a hydrogen atom or a methyl group, and s1 represents the number of methylene groups, and is a natural number of 2 to 9).

Examples of the monomer having a photoalignable group include monomers in which R in the formula (1) is OH such as 4-(6-methacryloxyhexyl-1-oxy)cinnamic acid, 4-(6-acryloxyhexyl-1-oxy)cinnamic acid, 4-(3-methacryloxypropyl-1-oxy)cinnamic acid, and 4-(4-(6-methacryloxyhexyl-1-oxy)benzoyloxy)cinnamic acid, and monomers in which R in the formula (1) is NH$_2$ such as 4-(6-methacryloxyhexyl-1-oxy)cinnamamide, 4-(6-acryloxyhexyl-1-oxy)cinnamamide, and 4-(3-methacryloxypropyl-1-oxy)cinnamamide.

[Liquid Crystalline Side Chain Monomer]

Here, the liquid crystalline side chain monomer is such a monomer that a polymer derived from the monomer develops liquid crystallinity and the polymer can form a mesogenic group in a side chain portion.

A mesogenic group in the side chain may be a group which forms a mesogenic structure by a single compound such as biphenyl or phenyl benzoate, or a group which forms a mesogenic structure by hydrogen bonding between side chains, such as benzoic acid. As the mesogenic group in the side chain, the following structures are preferable.

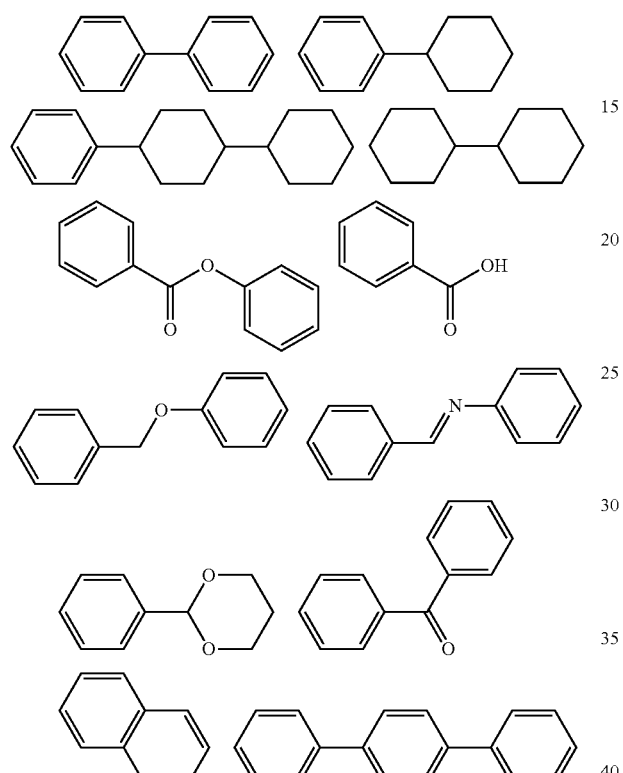

As a more specific example of the liquid crystalline side chain monomer, the liquid crystalline side chain monomer preferably has a structure having a polymerizable group constituted by at least one selected from the group consisting of radically polymerizable groups such as hydrocarbon, (meth)acrylate, itaconate, fumarate, maleate, α-methylene-γ-butyrolactone, styrene, vinyl, maleimido, and norbornene and siloxane, and a side chain constituted by at least one of the above formulae (21) to (31).

Among such liquid crystalline monomers, as a monomer having a carboxyl group, a monomer represented by a formula selected from the group consisting of the following formulae M2-0 to M2-9 may be used.

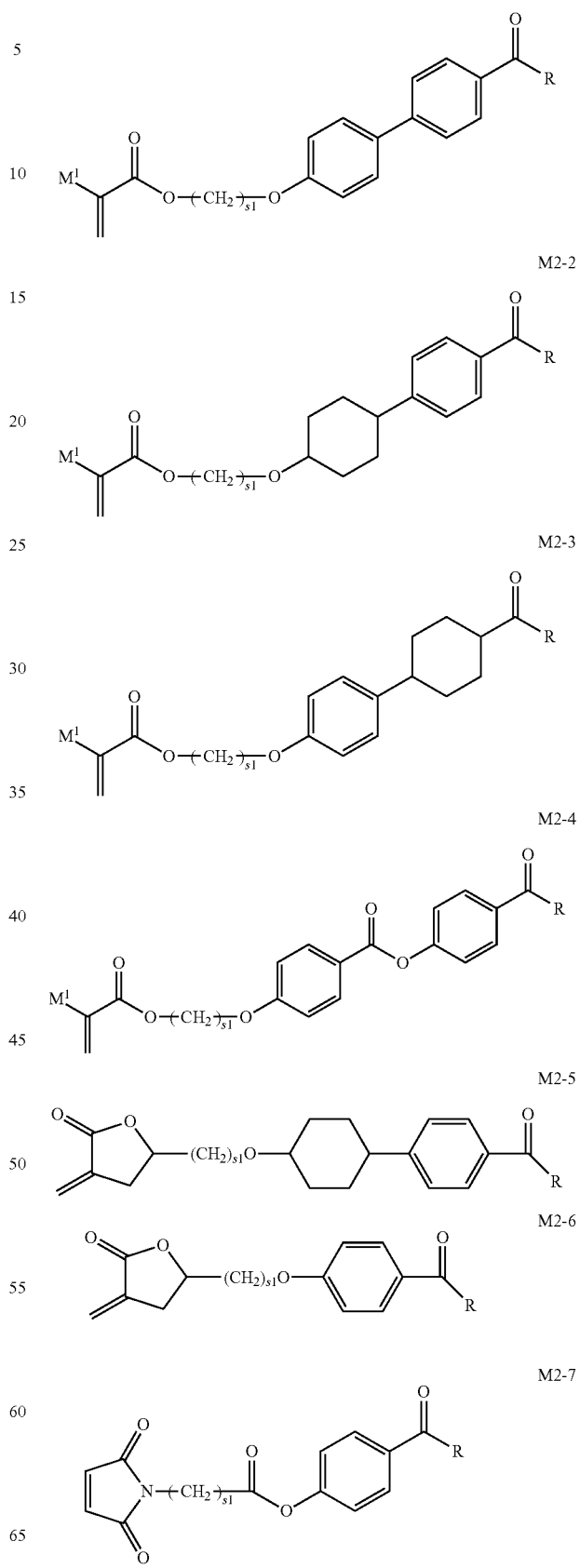

M2-8
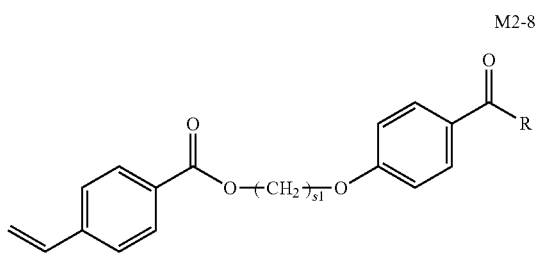

M2-9
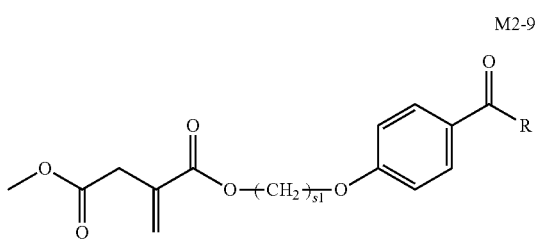

(In the formulae, R represents OH or NH$_2$, M1 represents a hydrogen atom or a methyl group, and s1 represents the number of methylene groups, and is a natural number of 2 to 9).

In addition, as a monomer having a substituent capable of developing liquid crystallinity which is one example of the other monomers, a monomer represented by a formula selected from the group consisting of the following formulae M2-10 to M2-16 may be used.

M2-10
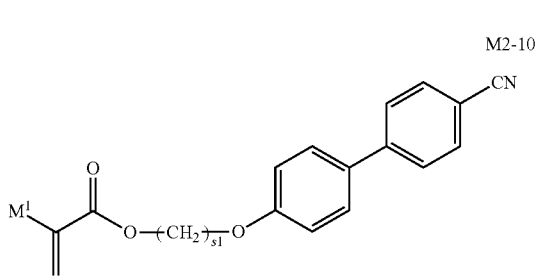

M2-11
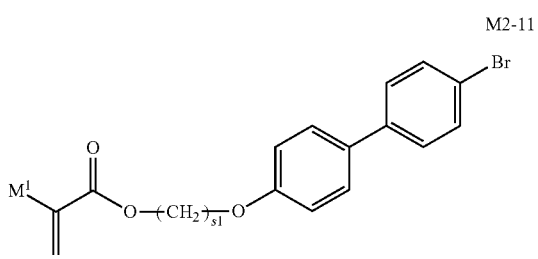

M2-12
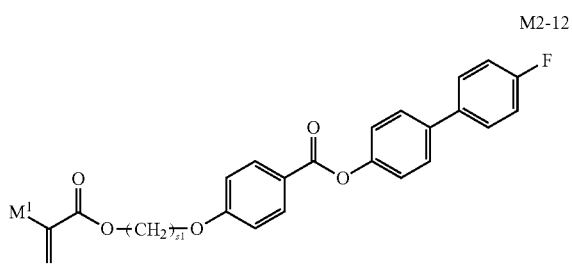

M2-13
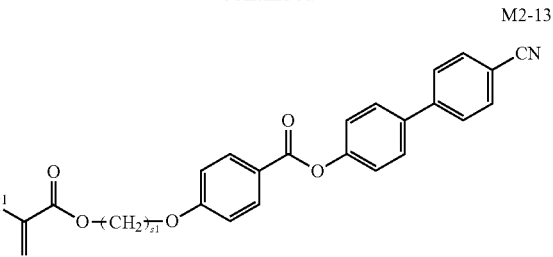

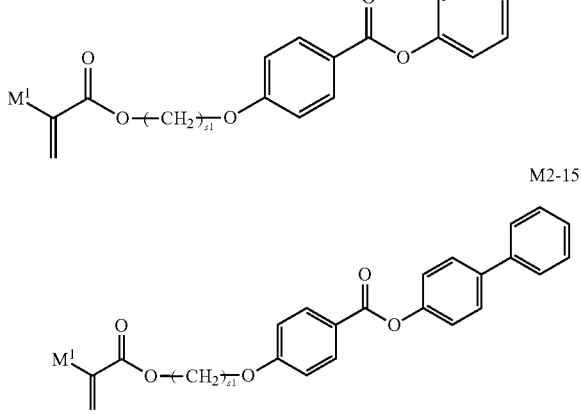

M2-15
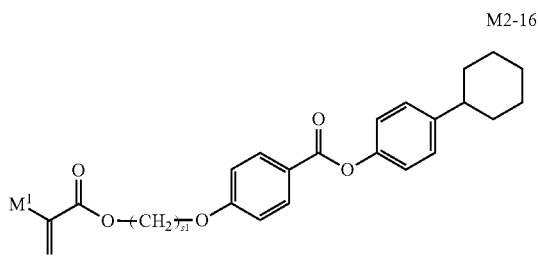

M2-16
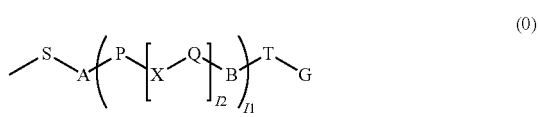

(In the formulae, M1 is a hydrogen atom or a methyl group, and s1 represents the number of methylene groups and is a natural number of 2 to 9.)

[Monomer Having Side Chain Represented by Formula (0)]

In order to further enhance the reliability of the voltage holding ratio (VHR) and the like of the liquid crystal alignment film to be obtained, the (A) side chain type polymer of the present invention may be obtained by copolymerizing a monomer having a side chain represented by the following formula (0):

$$\text{—S—A—}\left(\text{P—}\left[\text{X—Q}\right]_{l2}\text{B}\right)_{l1}\text{T—G}$$
(0)

In the formula, A and B each independently represent a single bond, —O—, —CH$_2$—, —COO—, —OCO—, —CONH—, —NH—CO—, —CH=CH—CO—O—, or —O—CO—CH=CH—;

S represents an alkylene group having 1 to 12 carbon atoms, and a hydrogen atom bonded thereto may be replaced with a halogen group;

T represents a single bond or an alkylene group having 1 to 12 carbon atoms, and a hydrogen atom bonded thereto may be replaced with a halogen group;

X represents a single bond, —COO—, —OCO—, —N=N—, —CH=CH—, —C≡C—, —CH=CH—CO—

O—, or —O—CO—CH═CH—, and when the number of X is 2, these Xs may be the same or different;

P and Q each independently represent a group selected from the group consisting of a divalent benzene ring, a naphthalene ring, a biphenyl ring, a furan ring, a pyrrole ring, an alicyclic hydrocarbon having 5 to 8 carbon atoms, and a combination thereof, and when X is CH═CH—CO—O— or —O—CO—CH═CH—, P or Q on a side to which —CH═CH— is bonded is an aromatic ring;

l1 represents 0 or 1;

l2 represents an integer of 0 to 2;

when both l1 and l2 are 0, A also represents a single bond when T is a single bond;

when l1 is 1, B also represents a single bond when T is a single bond; and

G is a group selected from the following formulae (G-1), (G-2), (G-3), and (G-4)

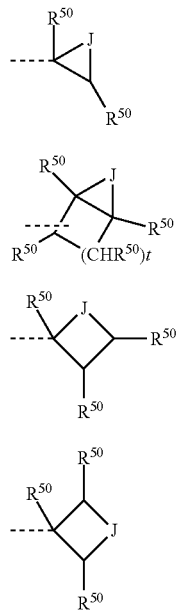

(G-1)

(G-2)

(G-3)

(G-4)

(In the formulae, a broken line represents a bond, $R^{50}$ represents a group selected from a hydrogen atom, a halogen atom, an alkyl group having 1 to 3 carbon atoms, and a phenyl group, and when a plurality of $R^{50}$s are present, the plurality of $R^{50}$s may be the same or different from each other. t is an integer from 1 to 7, J represents O, S, NH or $NR^{51}$, and $R^{51}$ represents a group selected from an alkyl group having 1 to 3 carbon atoms, and a phenyl group.).

As a more specific example of the monomer having the side chain represented by the formula (0), the monomer preferably has a structure including a polymerizable group constituted by at least one selected from the group consisting of radically polymerizable groups such as hydrocarbon, (meth)acrylate, itaconate, fumarate, maleate, α-methylene-γ-butyrolactone, styrene, vinyl, maleimide, and norbornene and siloxane, and a side chain represented by the formula (0) described above.

Among such monomers, specific examples of monomers having an epoxy group include compounds such as glycidyl (meth)acrylate, (3,4-epoxycyclohexyl)methyl (meth)acrylate, and allyl glycidyl ether, and among these, glycidyl (meth)acrylate, (3,4-epoxycyclohexyl)methyl (meth)acrylate, 3-ethenyl-7-oxabicyclo[4.1.0]heptane, 1,2-epoxy-5-hexene, 1,7-octadiene monoepoxide, and the like can be mentioned.

Specific examples of a monomer having thiirane include monomers in which the epoxy structure of the monomers having an epoxy group is replaced with thiirane.

Specific examples of a monomer having aziridine include monomers in which the epoxy structure of the monomers having an epoxy group is replaced with aziridine or 1-methylaziridine.

Examples of a monomer having an oxetane group include (meth)acrylate ester having an oxetane group. Among these monomers, 3-(methacryloyloxymethyl)oxetane, 3-(acryloyloxymethyl)oxetane, 3-(methacryloyloxymethyl)-3-ethyl-oxetane, 3-(acryloyloxymethyl)-3-ethyl-oxetane, 3-(methacryloyloxymethyl)-2-trifluoromethyloxetane, 3-(acryloyloxymethyl)-2-trifluoromethyloxetane, 3-(methacryloyloxymethyl)-2-phenyl-oxetane, 3-(acryloyloxymethyl)-2-phenyl-oxetane, 2-(methacryloyloxymethyl)oxetane, 2-(acryloyloxymethyl)oxetane, 2-(methacryloyloxymethyl)-4-trifluoromethyloxetane, and 2-(acryloyloxymethyl)-4-trifluoromethyloxetane are preferable, and 3-(methacryloyloxymethyl)-3-ethyl-oxetane, 3-(acryloyloxymethyl)-3-ethyl-oxetane, and the like can be mentioned.

As a monomer having a thietane group, for example, a monomer in which an oxetane group of the oxetane group-containing monomer is replaced with a thietane group is preferable.

As a monomer having an azetane group, for example, a monomer in which an oxetane group of the oxetane group-containing monomer is replaced with an azetane group is preferable.

Among the above, in view of availability and the like, a monomer having an epoxy group and a monomer having an oxetane group are preferable, and a monomer having an epoxy group is more preferable. Among these, from the viewpoint of availability, glycidyl (meth)acrylate is preferable.

[Monomer Having Side Chain (a)]

In order to obtain a more durable liquid crystal alignment film, the polymer serving as the (A) component of the present application may further have a side chain (a) having a group selected from a nitrogen-containing aromatic heterocyclic group, an amide group, and a urethane group. In order to prepare a polymer having the side chain (a), a monomer having the side chain (a) may be copolymerized.

A monomer having the side chain (a) preferably has a structure including a polymerizable group constituted by at least one selected from the group consisting of radically polymerizable groups such as hydrocarbon, (meth)acrylate, itaconate, fumarate, maleate, α-methylene-γ-butyrolactone, styrene, vinyl, maleimide, and norbornene and siloxane, and a side chain having a nitrogen-containing aromatic heterocyclic group, an amide group, and a urethane group. The NH of the amide group and the urethane group may or may not be substituted. Examples of the substituent in the case where the NH may be substituted include an alkyl group, a protecting group for an amino group, and a benzyl group.

The nitrogen-containing aromatic heterocyclic ring is desirably aromatic cyclic hydrocarbon having at least one and preferably 1 to 4 of structures selected from the group consisting of the following formulae [20a], [20b], and [20c] (in the formulae, $Z_2$ is a linear or branched alkyl group having 1 to 5 carbon atoms).

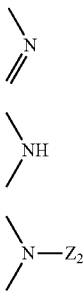

[20a]

[20b]

[20c]

Specific examples thereof include a pyrrole ring, an imidazole ring, an oxazole ring, a thiazole ring, a pyrazole ring, a pyridine ring, a pyrimidine ring, a quinoline ring, a pyrazoline ring, an isoquinoline ring, a carbazole ring, a purine ring, a thiadiazole ring, a pyridazine ring, a pyrazoline ring, a triazine ring, a pyrazolidine ring, a triazole ring, a pyrazine ring, a benzimidazole ring, a benzoimidazole ring, a cinnoline ring, a phenanthroline ring, an indole ring, a quinoxaline ring, a benzothiazole ring, a phenothiazine ring, an oxadiazole ring, and an acridine ring. Further, the carbon atom of these nitrogen-containing aromatic heterocyclic rings may have a substituent containing a hetero atom.

Among these, for example, a pyridine ring is preferable.

Among such monomers, specific examples of the monomer having a nitrogen-containing aromatic heterocyclic group include 2-(2-pyridylcarbonyloxy)ethyl (meth)acrylate, 2-(3-pyridylcarbonyloxy)ethyl (meth)acrylate, and 2-(4-pyridylcarbonyloxy)ethyl (meth)acrylate.

Specific examples of the monomer having an amide group or a urethane group include 2-(4-methylpiperidin-1-ylcarbonylamino)ethyl (meth)acrylate, N-(tert-butyloxycarbonyl)piperidin-4-yl 4-(6-methacryloyloxyhexyloxy)benzoate, and 2-(tert-butyloxycarbonylamino)ethyl 4-(6-methacryloyloxyhexyloxy)benzoate.

The (A) side chain type polymer can be obtained by a copolymerization reaction of the above-described photoreactive side chain monomer that develops liquid crystallinity and a monomer having a vertically alignable group. In addition, the (A) side chain type polymer can be obtained by copolymerizing a photoreactive side chain monomer that develops no liquid crystallinity, a liquid crystalline side chain monomer, and a monomer having a vertically alignable group, or copolymerizing a photoreactive side chain monomer that develops liquid crystallinity, a liquid crystalline side chain monomer, and a monomer having a vertically alignable group. Furthermore, copolymerization with another monomer can be performed within a range not to impair an ability to exhibit liquid crystallinity. To be noted, another monomer mentioned here may overlap with the above-described monomer having a vertically alignable group.

Examples of the other monomer include industrially available radically polymerizable monomers.

Specific examples of the other monomer include unsaturated carboxylic acid, an acrylic acid ester compound, a methacrylic acid ester compound, a maleimide compound, acrylonitrile, maleic anhydride, a styrene compound, and a vinyl compound.

Specific examples of the unsaturated carboxylic acid include acrylic acid, methacrylic acid, itaconic acid, maleic acid, and fumaric acid.

Examples of the acrylic acid ester compound include methyl acrylate, ethyl acrylate, isopropyl acrylate, benzyl acrylate, naphthyl acrylate, anthryl acrylate, anthrylmethyl acrylate, phenyl acrylate, 2,2,2-trifluoroethyl acrylate, tert-butyl acrylate, cyclohexyl acrylate, isobornyl acrylate, 2-methoxyethyl acrylate, methoxy triethylene glycol acrylate, 2-ethoxyethyl acrylate, tetrahydrofurfuryl acrylate, 3-methoxybutyl acrylate, 2-methyl-2-adamantyl acrylate, 2-propyl-2-adamantyl acrylate, 8-methyl-8-tricyclodecyl acrylate, and 8-ethyl-8-tricyclodecyl acrylate.

Examples of the methacrylic acid ester compound include methyl methacrylate, ethyl methacrylate, isopropyl methacrylate, benzyl methacrylate, naphthyl methacrylate, anthryl methacrylate, anthrylmethyl methacrylate, phenyl methacrylate, 2,2,2-trifluoroethyl methacrylate, tert-butyl methacrylate, cyclohexyl methacrylate, isobornyl methacrylate, 2-methoxyethyl methacrylate, methoxy triethylene glycol methacrylate, 2-ethoxyethyl methacrylate, tetrahydrofurfuryl methacrylate, 3-methoxybutyl methacrylate, 2-methyl-2-adamantyl methacrylate, 2-propyl-2-adamantyl methacrylate, 8-methyl-8-tricyclodecyl methacrylate, and 8-ethyl-8-tricyclodecyl methacrylate.

Examples of the vinyl compound include vinyl ether, methyl vinyl ether, benzyl vinyl ether, 2-hydroxyethyl vinyl ether, phenyl vinyl ether, and propyl vinyl ether.

Examples of the styrene compound include styrene, methyl styrene, chlorostyrene, and bromostyrene.

Examples of the maleimide compound include maleimide, N-methyl maleimide, N-phenylmaleimide, and N-cyclohexyl maleimide.

The content of the vertically alignable group in the side chain type polymer of the present invention is preferably from 0.1 mol % to 50 mol %, more preferably from 0.5 mol % to 40 mol %, and further more preferably from 1 mol % to 35 mol % from the viewpoint of influence on the liquid crystal aligning property.

The content of the photoreactive side chain in the side chain type polymer of the present invention is preferably from 20 mol % to 99.9 mol %, more preferably from 30 mol % to 95 mol %, and further more preferably from 40 mol % to 90 mol % from the viewpoint of, for example, the liquid crystal aligning property.

The content of the liquid crystalline side chain in the side chain type polymer of the present invention is preferably 80 mol % or less, more preferably from 10 mol % to 70 mol %, and further more preferably 20 mol % to 60 mol % from the viewpoint of, for example, the liquid crystal aligning property.

The side chain type polymer of the present invention may contain another side chain different from the side chain having vertical alignment ability, the photoreactive side chain, and the liquid crystalline side chain. The content of the other side chain is, in the case where the total content of the side chain having vertical alignment ability, the photoreactive side chain, and the liquid crystalline side chain is less than 100%, the remaining portion.

A method for producing the side chain type polymer according to the present embodiment is not particularly limited, and a general method used industrially can be used. Specifically, the side chain type polymer can be manufactured by cationic polymerization, radical polymerization, or anionic polymerization using a vinyl group of a liquid crystalline side chain monomer or a photoreactive side chain monomer. Among these, radical polymerization is particularly preferable from a viewpoint of easiness of reaction control.

As a polymerization initiator of radical polymerization, a known compound such as a radical polymerization initiator or a reversible addition-fragmentation chain transfer (RAFT) polymerization reagent can be used.

A radical thermal polymerization initiator is a compound to generate a radical by heating to a decomposition temperature or higher. Examples of the radical thermal polymerization initiator include a ketone peroxide (methyl ethyl ketone peroxide, cyclohexanone peroxide, or the like), a diacyl peroxide (acetyl peroxide, benzoyl peroxide, or the like), a hydroperoxide (hydrogen peroxide, tert-butyl hydroperoxide, cumene hydroperoxide, or the like), a dialkyl peroxide (di-tert-butyl peroxide, dicumyl peroxide, dilauroyl peroxide, or the like), a peroxy ketal (dibutyl peroxy cyclohexane or the like), an alkyl perester (peroxy neo decanoic acid-tert-butyl ester, peroxy pivalic acid-tert-butyl ester, peroxy 2-ethyl cyclohexanoic acid-tert-amyl ester, or the like), a persulfate salt (potassium persulfate, sodium persulfate, ammonium persulfate, or the like), and an azo compound (azobisisobutyronitrile, 2,2'-di(2-hydroxyethyl) azobisisobutyronitrile, or the like). Such a radical thermal polymerization initiator can be used singly or in combination of two or more kinds thereof.

A radical photopolymerization initiator is not particularly limited as long as being a compound to initiate radical polymerization by light irradiation. Examples of such a radical photopolymerization initiator include benzophenone, Michler's ketone, 4,4'-bis(diethylamino) benzophenone, xanthone, thioxanthone, isopropyl thioxanthone, 2,4-diethyl thioxanthone, 2-ethyl anthraquinone, acetophenone, 2-hydroxy-2-methyl propiophenone, 2-hydroxy-2-methyl-4'-isopropyl propiophenone, 1-hydroxycyclohexyl phenyl ketone, isopropyl benzoin ether, isobutyl benzoin ether, 2,2-diethoxyacetophenone, 2,2-dimethoxy-2-phenylacetophenone, camphorquinone, benzanthrone, 2-methyl-1-[4-(methylthio) phenyl]-2-morpholinopropan-1-one, 2-benzyl-2-dimethylamino-1-(4-morpholinophenyl)-butanone-1,4-dimethylamino ethyl benzoate, 4-dimethylamino isoamyl benzoate, 4,4'-di(t-butylperoxy carbonyl) benzophenone, 3,4,4'-tri(t-butyl peroxy carbonyl) benzophenone, 2,4,6-trimethylbenzoyl diphenyl phosphine oxide, 2-(4'-methoxystyryl)-4,6-bis(trichloromethyl)-s-triazine, 2-(3',4'-dimethoxystyryl)-4,6-bis(trichloromethyl)-s-triazine, 2-(2',4'-dimethoxystyryl)-4,6-bis(trichloromethyl)-s-triazine, 2-(2'-methoxystyryl)-4,6-bis(trichloromethyl)-s-triazine, 2-(4'-pentyloxystyryl)-4,6-bis(trichloromethyl)-s-triazine, 4-[p-N,N-di(ethoxycarbonylmethyl)]-2,6-di(trichloromethyl)-s-triazine, 1,3-bis(trichloromethyl)-5-(2'-chlorophenyl)-s-triazine, 1,3-bis(trichloromethyl)-5-(4'-methoxyphenyl)-s-triazine, 2-(p-dimethylaminostyryl) benzoxazole, 2-(p-dimethylaminostyryl) benzothiazole, 2-mercaptobenzothiazole, 3,3'-carbonyl bis(7-diethylamino coumarin), 2-(o-chlorophenyl)-4,4',5,5'-tetraphenyl-1,2'-biimidazole, 2,2'-bis(2-chlorophenyl)-4,4',5,5'-tetrakis(4-ethoxycarbonyl phenyl)-1,2'-biimidazole, 2,2'-bis(2,4-dichlorophenyl)-4,4',5,5'-tetraphenyl-1,2'-biimidazole, 2,2' bis(2,4-dibromophenyl)-4,4',5,5'-tetraphenyl-1,2'-biimidazole, 2,2'-bis(2,4,6-trichlorophenyl)-4,4',5,5'-tetraphenyl-1,2'-biimidazole, 3-(2-methyl-2-dimethylamino propionyl) carbazole, 3,6-bis(2-methyl-2-morpholino propionyl)-9-n-dodecyl carbazole, 1-hydroxycyclohexyl phenyl ketone, bis(5-2,4-cyclo pentadiene-1-yl)-bis(2,6-difluoro-3-(1H-pyrrol-1-yl)-phenyl) titanium, 3,3',4,4'-tetra(t-butyl peroxy carbonyl) benzophenone, 3,3',4,4'-tetra(t-hexyl peroxy carbonyl) benzophenone, 3,3'-di(methoxycarbonyl)-4,4'-di(t-butylperoxy carbonyl) benzophenone, 3,4'-di(methoxycarbonyl)-4,3'-di(t-butylperoxy carbonyl) benzophenone, 4,4'-di (methoxycarbonyl)-3,3'-di (t-butylperoxy carbonyl) benzophenone, 2-(3-methyl-3H-benzothiazol-2-ylidene)-1-naphthalen-2-yl-ethanone, or 2-(3-methyl-1,3-benzothiazole-2(3H)-ylidene)-1-(2-benzoyl) ethanone. These compounds can be used singly or in combination of two or more compounds thereof.

A radical polymerization method is not particularly limited, and an emulsion polymerization method, a suspension polymerization method, a dispersion polymerization method, a precipitation polymerization method, a bulk polymerization method, a solution polymerization method, and the like can be used.

The organic solvent used in the polymerization reaction of the photosensitive side chain type polymer capable of developing liquid crystallinity is not particularly limited as long as the produced polymer dissolves therein. Specific examples thereof include the following.

N,N-dimethylformamide, N,N-dimethylacetamide, N-methyl-2-pyrrolidone, N-ethyl-2-pyrrolidone, N-methyl caprolactam, dimethyl sulfoxide, tetramethylurea, pyridine, dimethyl sulfone, hexamethyl sulfoxide, γ-butyrolactone, isopropyl alcohol, methoxymethyl pentanol, dipentene, ethyl amyl ketone, methyl nonyl ketone, methyl ethyl ketone, methyl isoamyl ketone, methyl isopropyl ketone, methyl cellosolve, ethyl cellosolve, methyl cellosolve acetate, ethyl cellosolve acetate, butyl carbitol, ethyl carbitol, ethylene glycol, ethylene glycol monoacetate, ethylene glycol monoisopropyl ether, ethylene glycol monobutyl ether, propylene glycol, propylene glycol monoacetate, propylene glycol monomethyl ether, propylene glycol-tert-butyl ether, dipropylene glycol monomethyl ether, diethylene glycol, diethylene glycol monoacetate, diethylene glycol dimethyl ether, dipropylene glycol monoacetate monomethyl ether, dipropylene glycol monomethyl ether, dipropylene glycol monoethyl ether, dipropylene glycol monoacetate monoethyl ether, dipropylene glycol monopropyl ether, dipropylene glycol monoacetate monopropyl ether, 3-methyl-3-methoxybutyl acetate, tripropylene glycol methyl ether, 3-methyl-3-methoxy butanol, diisopropyl ether, ethyl isobutyl ether, diisobutylene, amyl acetate, butyl butyrate, butyl ether, diisobutyl ketone, methylcyclohexene, propyl ether, dihexyl ether, dioxane, n-hexane, n-pentane, n-octane, diethyl ether, cyclohexanone, ethylene carbonate, propylene carbonate, methyl lactate, ethyl lactate, methyl acetate, ethyl acetate, n-butyl acetate, propylene glycol monoethyl ether acetate, methyl pyruvate, ethyl pyruvate, methyl 3-methoxypropionate, methyl ethyl 3-ethoxypropionate, ethyl 3-methoxy propionate, 3-ethoxypropionic acid, 3-methoxypropionic acid, propyl 3-methoxy propionate, butyl 3-methoxy propionate, diglyme, 4-hydroxy-4-methyl-2-pentanone, 3-methoxy-N,N-dimethyl propanamide, 3-ethoxy-N,N-dimethyl propanamide, and 3-butoxy-N,N-dimethyl propanamide.

These organic solvents may be used alone or in mixture. Furthermore, even a solvent which does not dissolve a generated polymer may be used within a range not to make the generated polymer precipitate while being mixed with the above organic solvents.

In addition, oxygen in an organic solvent inhibits a polymerization reaction in radical polymerization, and thus an organic solvent which has been deaerated to a possible extent is preferably used.

As a polymerization temperature in radical polymerization, any temperature in a range of 30° C. to 150° C. can be selected, and a temperature in a range of 50° C. to 100° C. is preferable. In addition, a reaction can be performed at any concentration. However, when the concentration is too low, it is difficult to obtain a polymer having a high molecular weight. When the concentration is too high, the viscosity of a reaction liquid is too high, and uniform stirring is difficult. Therefore, the monomer concentration is preferably from 1% by mass to 50% by mass, and more preferably from 5% by mass to 30% by mass. The reaction is performed at a high concentration in an initial stage of the reaction, and thereafter, an organic solvent can be added.

In the above radical polymerization reaction, a large ratio of a radical polymerization initiator with respect to a monomer makes a molecular weight of a polymer to be obtained small, and a small ratio of the radical polymerization initiator makes the molecular weight of the polymer to be obtained large. Therefore, the ratio of a radical initiator is preferably from 0.1 mol % to 10 mol % with respect to a monomer to be polymerized. In polymerization, various monomer components, solvents, initiators, and the like can be added.

[Recovery of Polymer]

In the case of recovering the generated polymer from the reaction solution of the photosensitive side chain type polymer capable of developing liquid crystallinity that has been obtained by the above reaction, the reaction solution is poured into a poor solvent, and the polymer may be precipitated. Examples of the poor solvent used for precipitation include methanol, acetone, hexane, heptane, butyl cellosolve, heptane, methyl ethyl ketone, methyl isobutyl ketone, ethanol, toluene, benzene, diethyl ether, methyl ethyl ether, and water. A polymer precipitated by putting the reaction solution into the poor solvent can be recovered by filtration, and then can be dried at normal pressure or reduced pressure and at normal temperature or by heating. By repeating an operation for redissolving the precipitated and recovered polymer in an organic solvent and reprecipitating and recovering the polymer two to ten times, impurities in the polymer can be reduced. In this case, examples of the poor solvent include alcohols, ketones, and hydrocarbons. Use of three or more kinds of poor solvents selected from these is preferable because a purification efficiency is further increased.

Regarding the molecular weight of the (A) side chain type polymer of the present invention, in consideration of the strength of the coating film to be obtained, workability at the time of forming the coating film, and the uniformity of the coating film, the weight average molecular weight measured by a GPC (Gel Permeation Chromatography) method is preferably from 2,000 to 1,000,000, and more preferably from 5,000 to 500,000.

[Preparation of Polymer Composition]

The polymer composition used in the present invention is preferably prepared as a coating solution so as to be suitable for forming a liquid crystal alignment film. That is, the polymer composition used in the present invention is preferably prepared as a solution in which a resin component for forming a resin film is dissolved in an organic solvent. Here, the resin component is a resin component containing the photosensitive side chain type polymer capable of developing liquid crystallinity that has been already described. In this case, the content of the resin component is preferably from 1% by mass to 20% by mass, more preferably from 3% by mass to 15% by mass, and particularly preferably from 3% by mass to 10% by mass.

In the polymer composition of the present embodiment, the above-described resin component may be entirely the above-described photosensitive side chain type polymer capable of developing liquid crystallinity, but another polymer different therefrom may be mixed therein as long as the development ability of liquid crystallinity and photosensitivity are not impaired. In this case, the content of the other polymer in the resin component is from 0.5% by mass to 80% by mass, and preferably from 1% by mass to 50% by mass.

Such another polymer is constituted by, for example, poly (meth)acrylate, polyamic acid, or polyimide which is, for example, not a photosensitive side chain type polymer capable of developing liquid crystallinity.

<<(B) Organic Solvent>>

The organic solvent used for the polymer composition used in the present invention is not particularly limited as long as the organic solvent dissolves the resin component. Specific examples thereof include the following:

N,N-dimethylformamide, N,N-dimethylacetamide, N-methyl-2-pyrrolidone, N-methylcaprolactam, 2-pyrrolidone, N-ethylpyrrolidone, N-vinylpyrrolidone, dimethylsulfoxide, tetramethylurea, pyridine, dimethylsulfone, hexamethylsulfoxide, γ-butyrolactone, 3-methoxy-N,N-dimethylpropanamide, 3-ethoxy-N,N-dimethylpropanamide, 3-butoxy-N,N-dimethylpropanamide, 1,3-dimethyl-imidazolidinone, ethyl amyl ketone, methyl nonyl ketone, methyl ethyl ketone, methyl isoamyl ketone, methyl isopropyl ketone, cyclohexanone, ethylene carbonate, propylene carbonate, diglyme, 4-hydroxy-4-methyl-2-pentanone, propylene glycol monoacetate, propylene glycol monomethyl ether, propylene glycol-tert-butyl ether, dipropylene glycol monomethyl ether, diethylene glycol, diethylene glycol monoacetate, diethylene glycol dimethyl ether, dipropylene glycol monoacetate monomethyl ether, dipropylene glycol monomethyl ether, dipropylene glycol monoethyl ether, dipropylene glycol monoacetate monoethyl ether, dipropylene glycol monopropyl ether, dipropylene glycol monoacetate monopropyl ether, 3-methyl-3-methoxybutyl acetate, and tripropylene glycol methyl ether. These may be used alone or in mixture.

The polymer composition used in the present invention may contain components other than the (A) and (B) components. Examples thereof include, but not limited to, solvents and compounds for improving film thickness uniformity and surface smoothness when the polymer composition is applied, compounds for improving the adhesion between the liquid crystal alignment film and the substrate, and (C) amine compounds.

Specific examples of the solvent (poor solvent) for improving the uniformity of film thickness and surface smoothness include the following:

Solvents having low surface tension such as isopropyl alcohol, methoxymethylpentanol, methyl cellosolve, ethyl cellosolve, butyl cellosolve, methyl cellosolve acetate, ethyl cellosolve acetate, butyl carbitol, ethyl carbitol, ethyl carbitol acetate, ethylene glycol, ethylene glycol monoacetate, ethylene glycol monoisopropyl ether, ethylene glycol monobutyl ether, propylene glycol, propylene glycol monoacetate, propylene glycol monomethyl ether, propylene glycol-tert-butyl ether, dipropylene glycol monomethyl ether, diethylene glycol, diethylene glycol monoacetate, diethylene glycol dimethyl ether, dipropylene glycol monoacetate monomethyl ether, dipropylene glycol monomethyl ether, dipropylene glycol monoethyl ether, dipropylene glycol monoacetate monoethyl ether, dipropylene glycol monopropyl ether, dipropylene glycol monoacetate monopropyl ether, 3-methyl-3-methoxybutyl acetate, tripropylene glycol methyl ether, 3-methyl-3-methoxybutanol, diisopropyl ether, ethyl isobutyl ether, diisobutylene, amyl acetate, butyl butyrate, butyl ether, diisobutyl ketone, methylcyclohexene, propyl ether, dihexyl ether, 1-hexanol, n-hexane, n-pentane, n-octane, diethyl ether, methyl lactate, ethyl lactate, methyl acetate, ethyl acetate, n-butyl acetate, propylene glycol acetate monoethyl ether, methyl pyruvate, ethyl pyruvate, methyl 3-methoxypropionate, methylethyl 3-ethoxypropionate, ethyl 3-methoxypropionate, 3-ethoxypropionic acid, 3-methoxypropionic acid, propyl 3-methoxypropionate, butyl 3-methoxypropionate, 1-methoxy-2-propanol, 1-ethoxy-2-propanol, 1-butoxy-2-propanol, 1-phenoxy-2-propanol, propylene glycol monoacetate, propylene glycol diacetate, propylene glycol-1-monomethyl ether-2-acetate, propylene glycol-1-monoethyl ether-2-acetate, dipropylene glycol, 2-(2-ethoxypropoxy)propanol, methyl lactate, ethyl lactate, n-propyl lactate, n-butyl lactate, and isoamyl lactate.

These poor solvents may be used alone or in combination of two or more. In the case of using a solvent described above, the solvent is preferably 5% by mass to 80% by mass of the whole solvent, and more preferably 20% by mass to 60% by mass such that the solubility of the whole solvent contained in the polymer composition is not significantly lowered.

Examples of the compound for improving uniformity of film thickness and surface smoothness include fluorine-based surfactants, silicone-based surfactants, and nonionic surfactants.

More specific examples thereof include EFTOP (registered trademark) 301, EF303, and EF352 (manufactured by Tochem Products), MEGAFACE (registered trademark) F171, F173, and R-30 (manufactured by DIC Corporation), Fluorad FC430 and FC431 (manufactured by Sumitomo 3M Ltd.), Asahi Guard (registered trademark) AG710 (manufactured by Asahi Glass Co., Ltd.), and Surflon (registered trademark) S-382, SC101, SC102, SC103, SC104, SC105, and SC106 (manufactured by AGC Seimi Chemical Co., Ltd.). The use ratio of these surfactants is preferably 0.01 parts by mass to 2 parts by mass, and more preferably 0.01 parts by mass to 1 part by mass, with respect to 100 parts by mass of the resin component contained in the polymer composition.

Specific examples of the compound that improves the adhesion between the liquid crystal alignment film and the substrate include the functional silane-containing compounds described below.

Examples thereof include 3-aminopropyltrimethoxysilane, 3-aminopropyltriethoxysilane, 2-aminopropyltrimethoxysilane, 2-aminopropyltriethoxysilane, N-(2-aminoethyl)-3-aminopropyltrimethoxysilane, N-(2-aminoethyl)-3-aminopropylmethyldimethoxysilane, 3-ureidopropyltrimethoxysilane, 3-ureidopropyltriethoxysilane, N-ethoxycarbonyl-3-aminopropyltrimethoxysilane, N-ethoxycarbonyl-3-aminopropyltriethoxysilane, N-triethoxysilylpropyltriethylenetriamine, N-trimethoxysilylpropyltriethylenetriamine, 10-trimethoxysilyl-1,4,7-triazadecane, 10-triethoxysilyl-1,4,7-triazadecane, 9-trimethoxysilyl-3,6-diazononyl acetate, 9-triethoxysilyl-3,6-diazanonyl acetate, N-benzyl-3-aminopropyltrimethoxysilane, N-benzyl-3-aminopropyltriethoxysilane, N-phenyl-3-aminopropyltrimethoxysilane, N-phenyl-3-aminopropyltriethoxysilane, N-bis(oxyethylene)-3-aminopropyltrimethoxysilane, and N-bis(oxyethylene)-3-aminopropyltriethoxysilane.

Furthermore, for the purpose of preventing deterioration of the electric characteristics and the like due to the backlight when constituting the liquid crystal display element in addition to improving the adhesion between the substrate and the liquid crystal alignment film, phenoplast-based additives or epoxy group-containing compound additives shown below may be contained in the polymer composition.

Specific phenoplast additives are shown below, but the present invention is not limited to these structures.

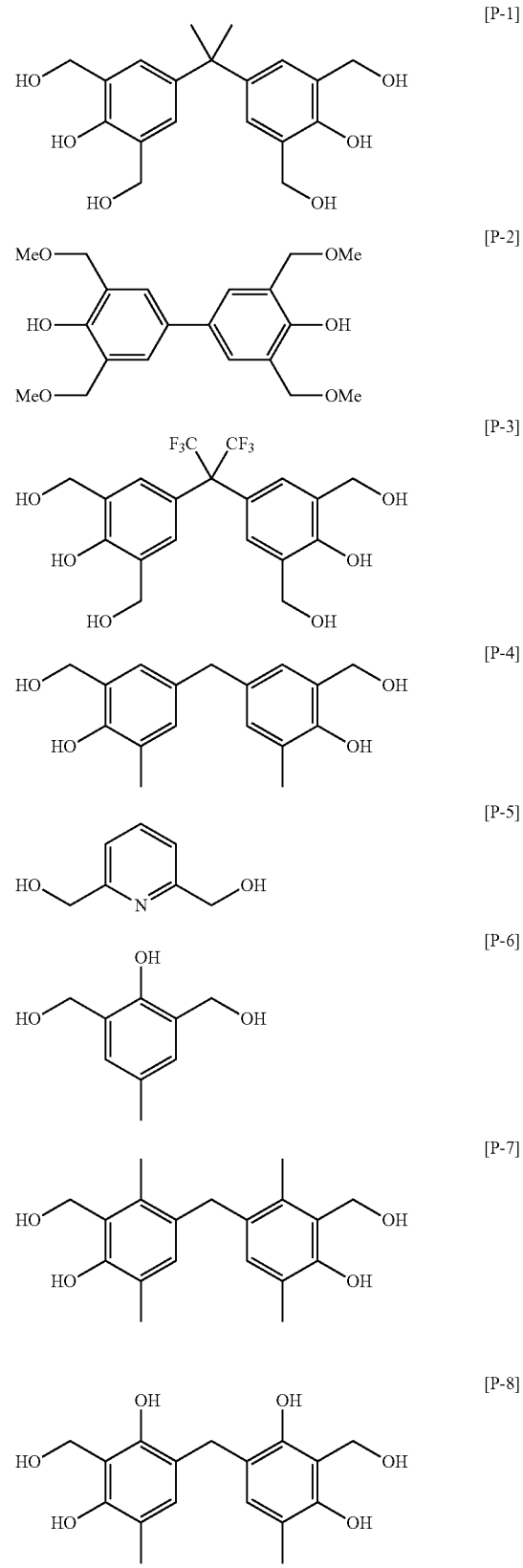

-continued

[P-9]

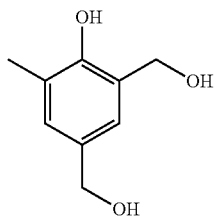

Specific examples of epoxy group-containing compounds include ethylene glycol diglycidyl ether, polyethylene glycol diglycidyl ether, propylene glycol diglycidyl ether, tripropylene glycol diglycidyl ether, polypropylene glycol diglycidyl ether, neopentyl glycol diglycidyl ether, 1,6-hexanediol diglycidyl ether, glycerol diglycidyl ether, 2,2-dibromoneopentyl glycol diglycidyl ether, 1,3,5,6-tetraglycidyl-2,4-hexanediol, N,N,N',N',-tetraglycidyl-m-xylenediamine, 1,3-bis(N,N-diglycidylaminomethyl)cyclohexane, and N,N,N',N',-tetraglycidyl-4,4'-diaminodiphenylmethane.

In the case of using a compound which improves the adhesion to the substrate, the amount of usage is preferably 0.1 parts by mass to 30 parts by mass and more preferably 1 part by mass to 20 parts by mass with respect to 100 parts by mass of the resin component contained in the polymer composition. When the amount of usage is less than 0.1 parts by mass, the effect of improving the adhesion cannot be expected, and when the amount is more than 30 parts by mass, the alignment property of the liquid crystal may be poor.

<<(C) Amine Compound>>

The polymer composition used in the present invention contains, as the (C) component, a specific amine compound, specifically, an amine compound which includes one primary amino group and a nitrogen-containing aromatic heterocyclic ring in the molecule and in which the primary amino group is bonded to an aliphatic hydrocarbon group or a non-aromatic cyclic hydrocarbon group. Such a compound is described as (B) component in WO2008/013285. By containing such an amine compound, elution of ionic impurities can be reduced when a liquid crystal alignment film is formed.

The specific amine compound is not particularly limited as long as the following effects i) and/or ii) is achieved when the polymer composition used in the present invention forms a liquid crystal alignment film: i) adsorbing ionic impurities in the liquid crystal on the liquid crystal alignment film interface and/or ii) achieving an improved voltage holding ratio.

The amount of the specific amine compound is not particularly limited as long as the above-described effect is achieved, and may be 0.01 to 10 parts by mass and preferably 0.1 to 5 parts by mass with respect to 100 parts by mass of the polymer composition used in the present invention.

In the polymer composition of the present invention, a photosensitizer can also be used as an additive. Colorless sensitizers and triplet sensitizers are preferable.

Examples of the photosensitizers include aromatic nitro compounds, coumarin (7-diethylamino-4-methylcoumarin, and 7-hydroxy4-methylcoumarin), ketocoumarin, carbonylbiscoumarin, aromatic 2-hydroxyketone, aromatic 2-hydroxyketone substituted with an amino group (2-hydroxybenzophenone, and mono- or di-p-(dimethylamino)-2-hydroxybenzophenone), acetophenone, anthraquinone, xanthone, thioxanthone, benzanthrone, thiazoline (2-benzoylmethylene-3-methyl-β-naphthothiazoline, 2-(β-naphthoylmethylene)-3-methylbenzothiazoline, 2-(α-naphthoylmethylene)-3-methylbenzothiazoline, 2-(4-biphenoylmethylene)-3-methylbenzothiazoline, 2-(β-naphthoylmethylene)-3-methyl-β-naphthothiazoline, 2-(4-biphenoylmethylene)-3-methyl-β-naphthothiazoline, 2-(p-fluorobenzoylmethylene)-3-methyl-β-naphthothiazoline), oxazoline (2-benzoylmethylene-3-methyl-β-naphthoxazoline, 2-(β-naphthoylmethylene)-3-methylbenzoxazoline, 2-(α-naphthoylmethylene)-3-methylbenzoxazoline, 2-(4-biphenoylmethylene)-3-methylbenzoxazoline, 2-(β-naphthoylmethylene)-3-methyl-β-naphthoxazoline, 2-(4-biphenoylmethylene)-3-methyl-β-naphthoxazoline, 2-(p-fluorobenzoylmethylene)-3-methyl-β-naphthoxazoline), benzothiazole, nitroaniline (m- or p-nitroaniline, and 2,4,6-trinitroaniline) or nitroacenaphthene (5-nitroacenaphthene), (2-[(m-hydroxy-p-methoxy)styryl]benzothiazole, benzoin alkyl ether, N-alkylated phthalone, acetophenone ketal (2,2-dimethoxyphenylethanone), naphthalene, anthracene (2-naphthalenemethanol, 2-naphthalenecarboxylic acid, 9-anthracenemethanol, and 9-anthracenecarboxylic acid), benzopyran, azoindolizine, and melocoumarin.

Aromatic 2-hydroxyketone (benzophenone), coumarin, ketocoumarin, carbonylbiscoumarin, acetophenone, anthraquinone, xanthone, thioxanthone, and acetophenone ketal are preferable.

In addition to the above-described ones, the polymer composition may contain, as long as the effect of the present invention is not impaired, a dielectric substance, a conductive substance for the purpose of changing the electric characteristics such as the dielectric constant and the conductivity of the liquid crystal alignment film, and a cross-linking compound may be further added for the purpose of increasing the hardness and denseness of the film when formed into a liquid crystal alignment film.

A method of applying the above-described polymer composition on a substrate having an electrode for driving liquid crystal is not particularly limited.

Industrially, the application is generally performed by screen printing, offset printing, flexographic printing, an inkjet method, or the like. As other methods of application, there are a dipping method, a roll coater method, a slit coater method, a spinner method (spin coating method), a spray method, and so forth, and these may be used in accordance with the purpose.

After applying the polymer composition on the substrate including the electrode for driving liquid crystal, the solvent is evaporated by a heating means such as a hot plate, a heat circulation type oven, or an IR (infrared) type oven at 50 to 230° C., preferably 50 to 220° C. for 0.4 to 60 minutes and preferably 0.5 to 10 minutes to obtain a coating film. The drying temperature at this time is preferably lower than the liquid crystal phase developing temperature of the side chain type polymer.

If the thickness of the coating film is too thick, it is disadvantageous in terms of power consumption of the liquid crystal display element, and if the thickness is too thin, the reliability of the liquid crystal display element may be deteriorated, so the thickness is preferably 5 nm to 300 nm and more preferably 10 nm to 150 nm.

It is also possible to provide a step of cooling the substrate on which the coating film has been formed to room temperature, after the [I] step and before the subsequent [II] step.

<Step [II]>

In the step [II], the coating film obtained in the step [I] is irradiated obliquely with polarized ultraviolet light. When the film surface of the coating film is irradiated with polarized ultraviolet light, the substrate is irradiated with polarized ultraviolet light through a polarizing plate in a certain direction with respect to the substrate. As ultraviolet light to be used, ultraviolet light having a wavelength in the range of 100 nm to 400 nm can be used. It is preferable to select an optimal wavelength through a filter or the like according to the kind of a coating film used. For example, ultraviolet light in a wavelength range of 290 nm to 400 nm can be selected to be used such that a photocrosslinking reaction can be induced selectively. Examples of the ultraviolet light include light emitted from a high pressure mercury lamp.

The irradiation amount of the polarized ultraviolet light depends on the coating film to be used. The amount with irradiation is preferably in the range of 1% to 70% and more preferably in the range of 1% to 50% of the amount of polarized ultraviolet light that realizes the maximum value of ΔA (hereinafter also referred to as ΔAmax) that is the difference between the ultraviolet absorbance in the direction parallel to the polarization direction of the polarized ultraviolet light and the ultraviolet absorbance in the direction perpendicular to the polarization direction of the polarized ultraviolet light.

The irradiation direction of the polarized ultraviolet light is usually 1° to 89°, preferably 10° to 80°, and particularly preferably 20° to 70° with respect to the substrate. If this angle is too small, there is a problem that the pretilt angle becomes small, and if the angle is too large, there is a problem that the pretilt angle becomes large.

As a method for adjusting the irradiation direction to the above angle, there are a method of tilting the substrate itself and a method of tilting the light beam, but tilting the light beam itself is more preferable from the viewpoint of production throughput of the liquid crystal display element.

<Step [III]>

In the step [III], the coating film irradiated with the polarized ultraviolet light in step [II] is heated. By applying heat, alignment control ability can be imparted to the coating film.

For the heating, a heating means such as a hot plate, a heat circulation type oven, or an IR (infrared) type oven can be used. The heating temperature can be determined in consideration of the temperature at which the liquid crystallinity of the coating film to be used is developed.

The heating temperature is preferably within a temperature range of a temperature at which the side chain type polymer develops liquid crystallinity (hereinafter referred to as liquid crystal development temperature). In the case of a thin film surface such as a coating film, the liquid crystal development temperature on the surface of the coating film is expected to be lower than the liquid crystal development temperature of the photosensitive side chain type polymer capable of developing liquid crystallinity as observed in a bulk state. Therefore, it is more preferable that the heating temperature is within the temperature range of the liquid crystal development temperature of the coating film surface. That is, the temperature range of the heating temperature after irradiation with polarized ultraviolet light is preferably set such that the lower limit is 10° C. lower than the lower limit of the temperature range of the liquid crystal development temperature of the side chain type polymer to be used, and the upper limit is 10° C. lower than the upper limit of the liquid crystal temperature range. If the heating temperature is lower than the above temperature range, the effect of amplifying the anisotropy in the coating film caused by heat tends to be insufficient, and if the heating temperature is too high above the above temperature range, the state of the coating film tends to be close to an isotropic liquid state (isotropic phase), and in this case, it may be difficult to realign in one direction by self-assembly.

Note that the liquid crystal development temperature refers to a temperature equal to or higher than the glass transition temperature (Tg) at which the side chain type polymer or the coating film surface undergoes a phase transition from the solid phase to the liquid crystal phase, and equal to or lower than the isotropic phase transition temperature (Tiso) causing phase transition from the liquid crystal phase to the isotropic phase (isotropic phase).

The thickness of the coating film formed after heating is preferably 5 nm to 300 nm and more preferably 50 nm to 150 nm, for the same reason as described in the step [I].

By having the above steps, in the production method of the present invention, highly efficient introduction of anisotropy into the coating film can be realized. Then, a substrate with a liquid crystal alignment film can be produced with high efficiency.

<Step [IV]>

In the [IV] step, the following liquid crystal display element is obtained. The liquid crystal display element includes a liquid crystal cell including two substrates obtained in [III] which are arranged so that the sides on which the liquid crystal alignment film is formed face each other, a liquid crystal layer provided between the substrates, and the above-described liquid crystal alignment film provided between the substrate and the liquid crystal layer and formed by the liquid crystal aligning agent of the present invention. Examples of such a liquid crystal display element of the present invention include various types such as a twisted nematic (TN) type, a vertical alignment (VA) type, a horizontal alignment (IPS: In-Plane Switching) type, and OCB alignment (OCB: Optically Compensated Bend) type.

When showing an example of production of the liquid crystal cell or the liquid crystal display element, a method of preparing the first and second substrates described above, scattering spacer on the liquid crystal alignment film of one of the substrates, sticking the other of the substrates such that the liquid crystal alignment film surface is on the inner side and ultraviolet light exposure directions are orthogonal to each other, injecting liquid crystal, and sealing the liquid crystal, a method of sticking and sealing substrates after dripping liquid crystal on the liquid crystal alignment film surface on which the spacer has been scattered, or the like can be exemplified. The diameter of the spacer at this time is preferably 1 μm to 30 μm, and more preferably 2 μm to 10 μm. The spacer diameter determines the distance between a pair of substrates nipping the liquid crystal layer, that is, the thickness of the liquid crystal layer.

For the obtained liquid crystal display element, it is preferable to further perform an annealing treatment for the alignment stability. The heating temperature is the phase transition temperature of the liquid crystal, and is preferably 10 to 160° C. and more preferably 50 to 140° C.

In the method for producing a substrate with a coating film of the present invention, a polymer composition is applied onto the substrate to form the coating film, and then polarized ultraviolet light is emitted in an oblique direction. Subsequently, heating is performed to realize highly efficient introduction of anisotropy into the side chain type polymer film, and thus a substrate with a liquid crystal alignment film having alignment control ability of the liquid crystal is produced.

In the coating film used in the present invention, highly efficient introduction anisotropy into the coating film is realized by utilizing the principle of molecular realignment induced by self-assembly based on photoreaction and liquid crystallinity of the side chain. In the production method of the present invention, in the case of a structure in which the side chain type polymer includes a photocrosslinkable group as a photoreactive group, after forming a coating film on a substrate by using a side chain type polymer, polarized ultraviolet light is emitted, subsequently heating is performed, and then a liquid crystal display element is produced.

Therefore, anisotropy can be highly efficiently introduced into the coating film used in the method of the present invention by performing irradiation of the coating film with polarized ultraviolet light and heat treatment sequentially, and thus anisotropy is introduced highly efficiently and the coating film can be formed as a liquid crystal alignment film excellent in alignment control ability.

Further, in the coating film used in the method of the present invention, the irradiation amount and direction of polarized ultraviolet light to the coating film, and the heating temperature in the heating treatment are optimized. Thereby, it is possible to realize highly efficient introduction of anisotropy into the coating film.

The irradiation amount of polarized ultraviolet light optimum for highly efficient introduction of anisotropy into the coating film used in the present invention corresponds to the irradiation amount of polarized ultraviolet light that optimizes the amount of photosensitive group in the coating film that undergoes a photocrosslinking reaction, a photoisomerization reaction, or a photo-Fries rearrangement reaction. When the amount of photosensitive groups in the side chain that undergo a photocrosslinking reaction, a photoisomerization reaction or a photo-Fries rearrangement reaction is small as a result of irradiating the coating film used in the present invention with polarized ultraviolet light, the amount of photoreaction does not reach a sufficient level. In this case, sufficient self-assembly does not proceed even if heating is performed thereafter. In contrast, when the photosensitive group of the side chain that undergoes a crosslinking reaction becomes excessive in the coating film used in the present invention as a result of irradiating the structure having a photocrosslinkable group with polarized ultraviolet light, the crosslinking reaction between the side chains progresses excessively. In this case, the film to be obtained becomes rigid and may interfere with the progress of self-assembly by subsequent heating. In addition, when the photosensitive group of the side chain that undergoes a photo-Fries rearrangement reaction becomes excessive in the coating film used in the present invention as a result of irradiating the structure having a photo-Fries rearrangement group with polarized ultraviolet light, the liquid crystallinity of the coating film decreases too much. In this case, the liquid crystallinity of the film to be obtained decreases and may interfere with the progress of self-assembly by subsequent heating. Furthermore, in the case of irradiating a structure having a photo-Fries rearrangement group with polarized ultraviolet light, when the irradiation amount of ultraviolet light is too large, the side chain type polymer optically decomposes, and may interfere with the progress of self-assembly by subsequent heating.

Therefore, in the coating film used in the present invention, the optimum amount by which a photocrosslinking reaction, a photoisomerization reaction, or a photo-Fries rearrangement reaction of the photosensitive group of the side chain is caused by irradiation with polarized ultraviolet light is preferably 0.1 to 40 mol % and more preferably 0.1 to 20 mol % of the photosensitive group contained in the side chain type polymer film. By setting the amount of the photosensitive group of the side chain that reacts with light within such a range, self-assembly in the subsequent heat treatment can proceed efficiently and highly efficient formation of anisotropy in the film becomes possible.

In the coating film used in the method of the present invention, by optimizing the irradiation amount of the polarized ultraviolet light, the amount of the photocrosslinking reaction, the photoisomerization reaction, or the photo-Fries rearrangement reaction of the photosensitive group in the side chain of the side chain type polymer film is optimized. Then, in addition to the subsequent heat treatment, highly efficient introduction of anisotropy into the coating film used in the present invention is realized. In this case, the amount of polarized ultraviolet light that is suitable can be determined on the basis of the evaluation of ultraviolet absorption of the coating film used in the present invention.

That is, for the coating film used in the present invention, ultraviolet absorption in the direction parallel to the polarization direction of polarized ultraviolet light and ultraviolet absorption in the direction perpendicular thereto after irradiation with the polarized ultraviolet light are respectively measured. From the measurement result of ultraviolet absorption, $\Delta A$ that is the difference between the ultraviolet absorbance in the direction parallel to the polarization direction of the polarized ultraviolet light and the ultraviolet absorbance in the direction perpendicular thereto in the coating film is evaluated. Then, the maximum value ($\Delta A max$) of $\Delta A$ realized in the coating film used in the present invention and the irradiation amount of the polarized ultraviolet light realizing the maximum value are obtained. In the production method of the present invention, the preferable amount of polarized ultraviolet light to be emitted in the production of the liquid crystal alignment film can be determined with reference to the irradiation amount of polarized ultraviolet light that realizes $\Delta A max$.

In the production method of the present invention, the amount of irradiation of the coating film used in the present invention with polarized ultraviolet light is preferably in the range of 1% to 70% and more preferably in the range of 1% to 50% of the amount of polarized ultraviolet light realizing $\Delta A max$. In the coating film used in the present invention, the irradiation amount of the polarized ultraviolet light in the range of 1% to 50% of the amount of the polarized ultraviolet light realizing $\Delta A max$ corresponds to the amount of polarized ultraviolet light that causes 0.1 mol % to 20 mol % of all the photosensitive groups included in the side chain type polymer film to undergo a photocrosslinking reaction.

As described above, in the production method of the present invention, in order to realize highly efficient introduction of anisotropy into the coating film, a preferable heating temperature as described above may be determined with reference to the liquid crystal temperature range of the side chain type polymer. Therefore, for example, when the liquid crystal temperature range of the side chain type polymer used in the present invention is 100° C. to 200° C., it is desirable to set the heating temperature after the irradiation with the polarized ultraviolet light to 90° C. to 190° C. By doing so, greater anisotropy is imparted to the coating film used in the present invention.

By doing so, the liquid crystal display element provided by the present invention exhibits high reliability against external stress such as light and heat.

As described above, the substrate for a twisted nematic type liquid crystal display element produced by the method of the present invention or a vertical electric field drive type liquid crystal display element including the substrate has excellent reliability and alignment stability, and can be suitably used for a high definition liquid crystal television of a large screen and the like.

Hereinafter, the present invention will be described by way of examples, but the present invention is not limited to the examples.

EXAMPLES

The abbreviations used in Examples are as follows.
<Methacrylic Monomer>
(Photoreactive Side Chain Monomer/Liquid Crystalline Side Chain Monomer)

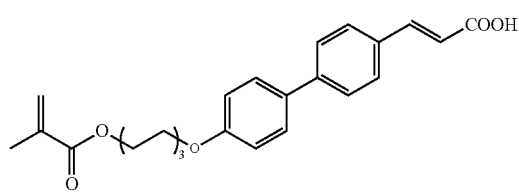

MA1

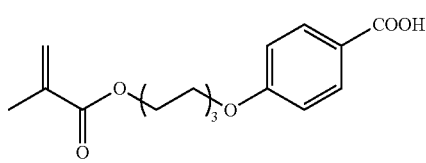

MA2

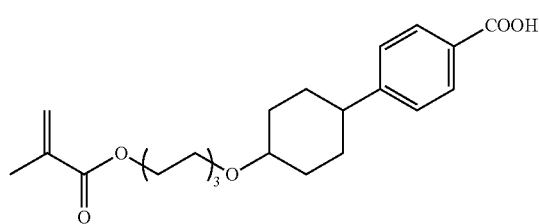

MA3

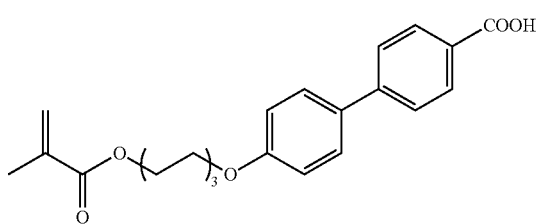

MA4

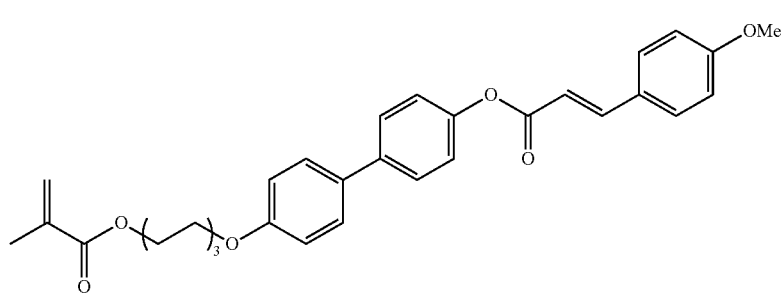

MA5

(Monomer Having Vertically Alignable Group (Tilt Imparting Component))

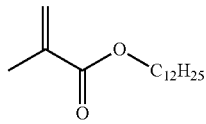

Side 3

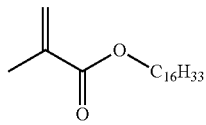

Side 4

-continued

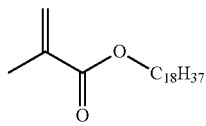

Side 5

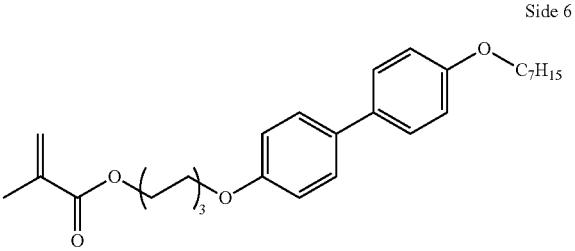

Side 6

-continued

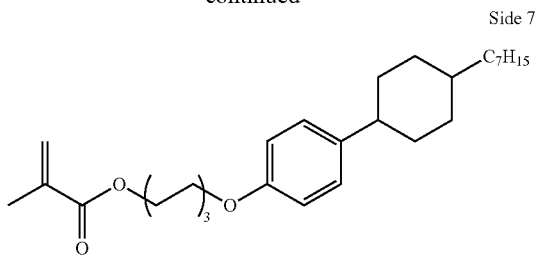

<Synthesis of MA1>

In a 3 L four-necked flask, 4-bromo-4'-hydroxybiphenyl [MA1-1] (150 g, 0.60 mol), tert-butyl acrylate [MA1-2] (162 g, 1.3 mol), palladium acetate (2.7 g, 12 mmol), tri(o-tolyl)phosphine (7.3 g, 24 mmol), tributylamine (334 g, 1.8 mol), and N,N-dimethylacetamide (750 g) were added, and the mixture was heated and stirred at 100° C. Reaction tracing was carried out by HPLC, and, after completion of the reaction was confirmed, the reaction solution was cooled to around room temperature and then poured into 1.8 L of 1 M aqueous solution of hydrochloric acid. Ethyl acetate (1 L) was added to this, and the aqueous layer was removed by liquid separation operation. The organic layer was washed twice with 1 L of 10% aqueous solution of hydrochloric acid

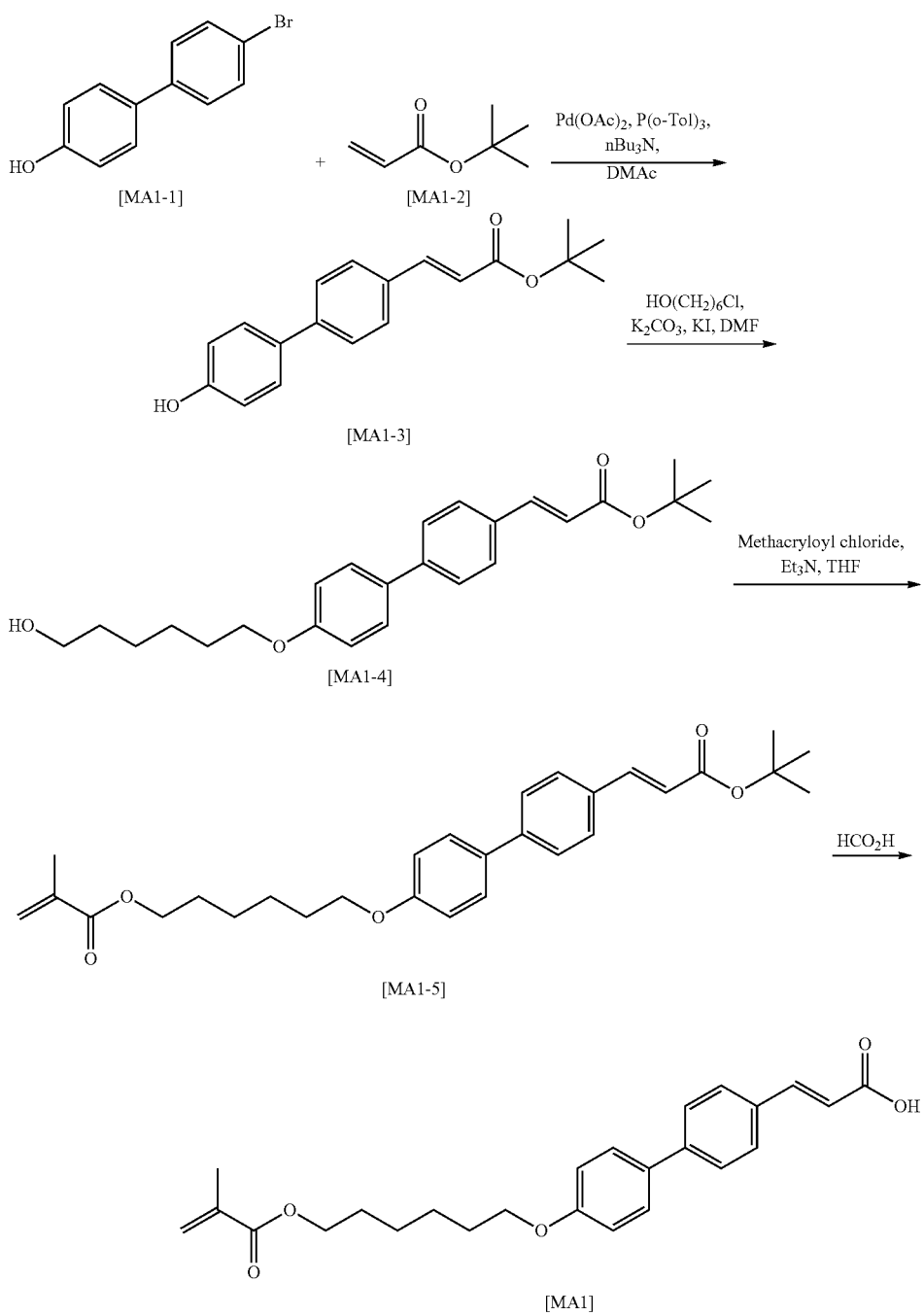

and three times with 1 L of saturated brine, and then the organic layer was dried with magnesium sulfate. Thereafter, the solvent was distilled off by filtration and with an evaporator to obtain 174 g (yield: 98%) of a compound [MA1-3] as an oily compound.

$^1$H-NMR (400 MHz, DMSO-d6, δppm): 9.68 (1H, s), 7.72 (2H, d), 7.63 (2H, d), 7.59-7.55 (9H, m), 6.87-6.85 (2H, m), 1.44 (9H, s).

The compound [MA1-3] (174 g, 0.59 mol) obtained above, 6-chloro-1-hexanol (96.7 g, 0.71 mol), potassium carbonate (163 g, 1.2 mol), potassium iodide (9.8 g, 59 mmol) and N, N-dimethylformamide (1600 g) were added to a 2 L four-necked flask equipped with a mechanical stirrer and a stirring blade, and the mixture was heated and stirred at 80° C. Reaction tracing was carried out by HPLC, and, after completion of the reaction was confirmed, the reaction solution was cooled to around room temperature and then the reaction solution was poured into 2 L of distilled water. The precipitated solid was filtered off, poured into a methanol/distilled water (1:1) solution, and filtered again. The obtained solid was dried under reduced pressure to obtain 221 g of a compound [MA1-4] (yield: 95%).

$^1$H-NMR (400 MHz, CDCl$_3$, δppm): 7.61 (1H, d), 7.56-7.52 (6H, m), 6.98-6.95 (2H, m), 6.38 (1H, d), 4.02 (2H, t), 3.67 (2H, t), 1.84-1.44 (17H, m).

The compound [MA1-4] (221 g, 0.56 mol) obtained above, triethylamine (67.7 g, 0.67 mol), and tetrahydrofuran (1800 g) were added to a 3 L four-necked flask, and the reaction solution was cooled. To this, a tetrahydrofuran (200 g) solution of methacrylic acid chloride (70.0 g, 0.67 mmol) was added dropwise while care was taken such that the internal temperature did not exceed 10° C. After completion of the dropwise addition, the reaction solution was brought to 23° C. and further reaction was carried out. After tracing the reaction by HPLC and confirming completion of the reaction, the reaction solution was poured into 6 L of distilled water, 2 L of ethyl acetate was added thereto, and the aqueous layer was removed by a liquid separation operation. Thereafter, the organic layer was washed successively with a 5% aqueous solution of potassium hydroxide, a 1 M aqueous solution of hydrochloric acid, and a saturated brine, and the organic layer was dried with magnesium sulfate. After that, the solvent was distilled off by filtration and with an evaporator, and thus a crude product was obtained. The obtained crude product was washed with 100 g of 2-propanol, filtered, and dried to obtain 127 g (yield 49%) of a compound [MA1-5].

$^1$H-NMR (400 MHz, DMSO-d6, δppm): 7.73 (2H, d), 7.70-7.63 (4H, m), 7.58 (1H, d), 7.02-7.00 (2H, m), 6.53 (1H, d), 6.03-6.02 (1H, m), 5.67-5.66 (1H, m), 4.11 (2H, t), 4.00 (2H, t), 1.88-1.87 (3H, m), 1.79-1.25 (17H, m).

The compound [MA1-5] (81 g, 0.17 mol) obtained above and formic acid (400 g) were added to a 1 L four-necked flask, and were heated and stirred at 40° C. Reaction tracing was carried out by HPLC, and after completion of the reaction was confirmed, the reaction solution was poured into 3 L of distilled water and filtered. The obtained solid was washed with 200 g of methanol, and the solid was dried to obtain 56 g of a compound [MA1] (yield: 79%).

$^1$H-NMR (400 MHz, CDCl$_3$, δppm): 7.81 (1H, d), 7.60 (4H, s), 7.55 (2H, d), 6.97 (2H, d), 6.47 (2H, d), 6.11-6.10 (1H, m), 5.56-5.52 (1H, m), 4.17 (2H, t), 4.00 (2H, t), 1.95-1.94 (2H, m), 1.85-1.82 (3H, m), 1.75-1.71 (2H, m), 1.55-1.48 (4H, m).

MA2 was synthesized by the synthesis method described in Patent Document (JP 9-118717 A).

MA3 was synthesized by a known method using 4-phenylcyclohexanone as a raw material.

For MA4, commercially available M6BC (manufactured by Midori Kagaku Co., Ltd.) was used.

Side 1, 2, 3, 5 were purchased from Tokyo Chemical Industry Co., Ltd. and used.

Side 4 was purchased from Wako Pure Chemical Industries, Ltd. and used.

Sides 6 and 7 were synthesized by the synthesis method described in Patent Document (WO2011-125876).

In addition, the conditions for measuring the molecular weight of the resin were as follows.

Apparatus: a room temperature gel permeation chromatography (GPC) apparatus (SSC-7200) manufactured by Senshu Scientific Co., Ltd., Column: columns manufactured by Shodex (KD-803, KD-805), Column temperature: 50° C., Eluent: N,N'-dimethylformamide (30 mmol/L of lithium bromide-hydrate (LiBr.H2O), 30 mmol/L of phosphoric acid·anhydrous crystal (o-phosphoric acid), and 10 ml/L of tetrahydrofuran (THF) as additives), Flow rate: 1.0 ml/min, Standard sample for preparing a calibration curve: TSK standard polyethylene oxide (molecular weight: about 9000, 000, 150,000, 100,000, and 30,000) manufactured by Tosoh Corporation, and polyethylene glycol (molecular weight: about 12,000, 4,000, and 1,000) manufactured by Polymer Laboratories.

<Organic Solvent>
NMP: N-methyl-2-pyrrolidone
BCS: butyl cellosolve
<Polymerization Initiator>
AIBN: 2,2'-azobisisobutyronitrile
<Methacrylate Polymer Synthesis Example 1>

MA1 (20.4 g, 50.0 mmol), MA2 (15.3 g, 50.0 mmol) and Side 1 (3.0 g, 30.0 mmol) were dissolved in NMP (277.0 g), degassed with a diaphragm pump and purged with nitrogen, then AIBN (0.82 g, 5.0 mmol) was added thereto and degassing and purging with nitrogen were performed again. After that, the mixture was reacted at 60° C. for 24 hours to obtain a polymer solution of methacrylate. This polymer solution was added dropwise to methanol (5000 ml), and the resulting precipitate was filtered. This precipitate was washed with methanol and dried under reduced pressure in an oven at 40° C. to obtain methacrylate polymer powder P1. The obtained methacrylate polymer had a number average molecular weight of 25000 and a weight average molecular weight of 300000.

NMP (114.0 g) was added to the obtained methacrylic polymer powder (A1) (6.0 g), and the mixture was stirred at room temperature for 5 hours for dissolution. BCS (30.0 g) was added to this solution, and the mixture was stirred at room temperature for 5 hours to obtain a liquid crystal aligning agent B1.

<Methacrylate Polymer Synthesis Example 2>

MA1 (20.4 g, 50.0 mmol), MA2 (15.3 g, 50.0 mmol) and Side 2 (1.7 g, 10.0 mmol) were dissolved in NMP (267.9 g), degassed with a diaphragm pump and purged with nitrogen, then AIBN (0.82 g, 5.0 mmol) was added thereto and degassing and purging with nitrogen were performed again. After that, the mixture was reacted at 60° C. for 24 hours to obtain a polymer solution of methacrylate. This polymer solution was added dropwise to methanol (5000 ml), and the resulting precipitate was filtered. This precipitate was washed with methanol and dried under reduced pressure in an oven at 40° C. to obtain methacrylate polymer powder.

The obtained methacrylate polymer had a number average molecular weight of 27000 and a weight average molecular weight of 310000.

NMP (114.0 g) was added to the obtained methacrylic polymer powder (A2) (6.0 g), and the mixture was stirred at room temperature for 5 hours for dissolution. BCS (30.0 g) was added to this solution, and the mixture was stirred at room temperature for 5 hours to obtain a liquid crystal aligning agent B2.

<Methacrylate Polymer Synthesis Example 3>

MA1 (20.4 g, 50.0 mmol), MA2 (15.3 g, 50.0 mmol) and Side 2 (3.4 g, 20.0 mmol) were dissolved in NMP (279.8 g), degassed with a diaphragm pump and purged with nitrogen, then AIBN (0.82 g, 5.0 mmol) was added thereto and degassing and purging with nitrogen were performed again. After that, the mixture was reacted at 60° C. for 24 hours to obtain a polymer solution of methacrylate. This polymer solution was added dropwise to methanol (5000 ml), and the resulting precipitate was filtered. This precipitate was washed with methanol and dried under reduced pressure in an oven at 40° C. to obtain methacrylate polymer powder. The obtained methacrylate polymer had a number average molecular weight of 40900 and a weight average molecular weight of 325000.

NMP (114.0 g) was added to the obtained methacrylic polymer powder (A3) (6.0 g), and the mixture was stirred at room temperature for 5 hours for dissolution. BCS (30.0 g) was added to this solution, and the mixture was stirred at room temperature for 5 hours to obtain a liquid crystal aligning agent B3.

<Methacrylate Polymer Synthesis Example 4>

MA1 (20.4 g, 50.0 mmol), MA2 (15.3 g, 50.0 mmol) and Side 3 (2.5 g, 10.0 mmol) were dissolved in NMP (273.8 g), degassed with a diaphragm pump and purged with nitrogen, then AIBN (0.82 g, 5.0 mmol) was added thereto and degassing and purging with nitrogen were performed again. After that, the mixture was reacted at 60° C. for 24 hours to obtain a polymer solution of methacrylate. This polymer solution was added dropwise to methanol (5000 ml), and the resulting precipitate was filtered. This precipitate was washed with methanol and dried under reduced pressure in an oven at 40° C. to obtain methacrylate polymer powder. The obtained methacrylate polymer had a number average molecular weight of 35000 and a weight average molecular weight of 290000.

NMP (114.0 g) was added to the obtained methacrylic polymer powder (A4) (6.0 g), and the mixture was stirred at room temperature for 5 hours for dissolution. BCS (30.0 g) was added to this solution, and the mixture was stirred at room temperature for 5 hours to obtain a liquid crystal aligning agent B4.

<Methacrylate Polymer Synthesis Example 5>

MA1 (20.4 g, 50.0 mmol), MA2 (15.3 g, 50.0 mmol) and Side 3 (7.6 g, 30.0 mmol) were dissolved in NMP (309.4 g), degassed with a diaphragm pump and purged with nitrogen, then AIBN (0.82 g, 5.0 mmol) was added thereto and degassing and purging with nitrogen were performed again. After that, the mixture was reacted at 60° C. for 24 hours to obtain a polymer solution of methacrylate. This polymer solution was added dropwise to methanol (5000 ml), and the resulting precipitate was filtered. This precipitate was washed with methanol and dried under reduced pressure in an oven at 40° C. to obtain methacrylate polymer powder. The obtained methacrylate polymer had a number average molecular weight of 36000 and a weight average molecular weight of 300000.

NMP (114.0 g) was added to the obtained methacrylic polymer powder (A5) (6.0 g), and the mixture was stirred at room temperature for 5 hours for dissolution. BCS (30.0 g) was added to this solution, and the mixture was stirred at room temperature for 5 hours to obtain a liquid crystal aligning agent B5.

<Methacrylate Polymer Synthesis Example 6>

MA1 (20.4 g, 50.0 mmol), MA2 (15.3 g, 50.0 mmol) and Side 4 (3.1 g, 10.0 mmol) were dissolved in NMP (277.7 g), degassed with a diaphragm pump and purged with nitrogen, then AIBN (0.82 g, 5.0 mmol) was added thereto and degassing and purging with nitrogen were performed again. After that, the mixture was reacted at 60° C. for 24 hours to obtain a polymer solution of methacrylate. This polymer solution was added dropwise to methanol (5000 ml), and the resulting precipitate was filtered. This precipitate was washed with methanol and dried under reduced pressure in an oven at 40° C. to obtain methacrylate polymer powder. The obtained methacrylate polymer had a number average molecular weight of 35000 and a weight average molecular weight of 275000.

NMP (114.0 g) was added to the obtained methacrylic polymer powder (A6) (6.0 g), and the mixture was stirred at room temperature for 5 hours for dissolution. BCS (30.0 g) was added to this solution, and the mixture was stirred at room temperature for 5 hours to obtain a liquid crystal aligning agent B6.

<Methacrylate Polymer Synthesis Example 7>

MA1 (20.4 g, 50.0 mmol), MA2 (15.3 g, 50.0 mmol) and Side 6 (4.5 g, 10.0 mmol) were dissolved in NMP (277.7 g), degassed with a diaphragm pump and purged with nitrogen, then AIBN (0.82 g, 5.0 mmol) was added thereto and degassing and purging with nitrogen were performed again. After that, the mixture was reacted at 60° C. for 24 hours to obtain a polymer solution of methacrylate. This polymer solution was added dropwise to methanol (5000 ml), and the resulting precipitate was filtered. This precipitate was washed with methanol and dried under reduced pressure in an oven at 40° C. to obtain methacrylate polymer powder. The obtained methacrylate polymer had a number average molecular weight of 35000 and a weight average molecular weight of 275000.

NMP (114.0 g) was added to the obtained methacrylic polymer powder (A7) (6.0 g), and the mixture was stirred at room temperature for 5 hours for dissolution. BCS (30.0 g) was added to this solution, and the mixture was stirred at room temperature for 5 hours to obtain a liquid crystal aligning agent B7.

<Methacrylate Polymer Synthesis Example 8>

MA1 (20.4 g, 50.0 mmol), MA2 (15.3 g, 50.0 mmol) and Side 6 (13.6 g, 30.0 mmol) were dissolved in NMP (351.0 g), degassed with a diaphragm pump and purged with nitrogen, then AIBN (0.82 g, 5.0 mmol) was added thereto and degassing and purging with nitrogen were performed again. After that, the mixture was reacted at 60° C. for 24 hours to obtain a polymer solution of methacrylate. This polymer solution was added dropwise to methanol (5000 ml), and the resulting precipitate was filtered. This precipitate was washed with methanol and dried under reduced pressure in an oven at 40° C. to obtain methacrylate polymer powder. The obtained methacrylate polymer had a number average molecular weight of 26000 and a weight average molecular weight of 275000.

NMP (114.0 g) was added to the obtained methacrylic polymer powder (A8) (6.0 g), and the mixture was stirred at room temperature for 5 hours for dissolution. BCS (30.0 g)

was added to this solution, and the mixture was stirred at room temperature for 5 hours to obtain a liquid crystal aligning agent B8.

<Methacrylate Polymer Synthesis Example 9>

MA1 (20.4 g, 50.0 mmol), MA2 (15.3 g, 50.0 mmol) and Side 7 (4.4 g, 10.0 mmol) were dissolved in NMP (286.9 g), degassed with a diaphragm pump and purged with nitrogen, then AIBN (0.82 g, 5.0 mmol) was added thereto and degassing and purging with nitrogen were performed again. After that, the mixture was reacted at 60° C. for 24 hours to obtain a polymer solution of methacrylate. This polymer solution was added dropwise to methanol (5000 ml), and the resulting precipitate was filtered. This precipitate was washed with methanol and dried under reduced pressure in an oven at 40° C. to obtain methacrylate polymer powder. The obtained methacrylate polymer had a number average molecular weight of 25000 and a weight average molecular weight of 350000.

NMP (114.0 g) was added to the obtained methacrylic polymer powder (A9) (6.0 g), and the mixture was stirred at room temperature for 5 hours for dissolution. BCS (30.0 g) was added to this solution, and the mixture was stirred at room temperature for 5 hours to obtain a liquid crystal aligning agent B9.

<Methacrylate Polymer Synthesis Example 10>

MA1 (20.4 g, 50.0 mmol), MA2 (15.3 g, 50.0 mmol) and Side 7 (13.3 g, 30.0 mmol) were dissolved in NMP (348.9 g), degassed with a diaphragm pump and purged with nitrogen, then AIBN (0.82 g, 5.0 mmol) was added thereto and degassing and purging with nitrogen were performed again. After that, the mixture was reacted at 60° C. for 24 hours to obtain a polymer solution of methacrylate. This polymer solution was added dropwise to methanol (5000 ml), and the resulting precipitate was filtered. This precipitate was washed with methanol and dried under reduced pressure in an oven at 40° C. to obtain methacrylate polymer powder. The obtained methacrylate polymer had a number average molecular weight of 25000 and a weight average molecular weight of 350000.

NMP (114.0 g) was added to the obtained methacrylic polymer powder (A10) (6.0 g), and the mixture was stirred at room temperature for 5 hours for dissolution. BCS (30.0 g) was added to this solution, and the mixture was stirred at room temperature for 5 hours to obtain a liquid crystal aligning agent B10.

<Methacrylate Polymer Synthesis Example 11>

MA1 (20.4 g, 50.0 mmol), MA3 (19.4 g, 50.0 mmol) and Side 3 (2.5 g, 10.0 mmol) were dissolved in NMP (302.5 g), degassed with a diaphragm pump and purged with nitrogen, then AIBN (0.82 g, 5.0 mmol) was added thereto and degassing and purging with nitrogen were performed again. After that, the mixture was reacted at 60° C. for 24 hours to obtain a polymer solution of methacrylate. This polymer solution was added dropwise to methanol (5000 ml), and the resulting precipitate was filtered. This precipitate was washed with methanol and dried under reduced pressure in an oven at 40° C. to obtain methacrylate polymer powder. The obtained methacrylate polymer had a number average molecular weight of 27000 and a weight average molecular weight of 300000.

NMP (114.0 g) was added to the obtained methacrylic polymer powder (A11) (6.0 g), and the mixture was stirred at room temperature for 5 hours for dissolution. BCS (30.0 g) was added to this solution, and the mixture was stirred at room temperature for 5 hours to obtain a liquid crystal aligning agent B11.

<Methacrylate Polymer Synthesis Example 12>

MA1 (20.4 g, 50.0 mmol), MA2 (7.7 g, 25.0 mmol), MA4 (9.6 g, 25.0 mmol), and Side 3 (2.5 g, 10.0 mmol) were dissolved in NMP (302.5 g), degassed with a diaphragm pump and purged with nitrogen, then AIBN (0.82 g, 5.0 mmol) was added thereto and degassing and purging with nitrogen were performed again. After that, the mixture was reacted at 60° C. for 24 hours to obtain a polymer solution of methacrylate. This polymer solution was added dropwise to methanol (5000 ml), and the resulting precipitate was filtered. This precipitate was washed with methanol and dried under reduced pressure in an oven at 40° C. to obtain methacrylate polymer powder. The obtained methacrylate polymer had a number average molecular weight of 27000 and a weight average molecular weight of 300000.

NMP (114.0 g) was added to the obtained methacrylic polymer powder (A12) (6.0 g), and the mixture was stirred at room temperature for 5 hours for dissolution. BCS (30.0 g) was added to this solution, and the mixture was stirred at room temperature for 5 hours to obtain a liquid crystal aligning agent B12.

<Methacrylate Polymer Synthesis Example 13>

MA1 (20.4 g, 50.0 mmol), MA3 (9.6 g, 25.0 mmol), MA4 (9.6 g, 25.0 mmol), and Side 3 (2.5 g, 10.0 mmol) were dissolved in NMP (302.5 g), degassed with a diaphragm pump and purged with nitrogen, then AIBN (0.82 g, 5.0 mmol) was added thereto and degassing and purging with nitrogen were performed again. After that, the mixture was reacted at 60° C. for 24 hours to obtain a polymer solution of methacrylate. This polymer solution was added dropwise to methanol (5000 ml), and the resulting precipitate was filtered. This precipitate was washed with methanol and dried under reduced pressure in an oven at 40° C. to obtain methacrylate polymer powder. The obtained methacrylate polymer had a number average molecular weight of 26000 and a weight average molecular weight of 290000.

NMP (114.0 g) was added to the obtained methacrylic polymer powder (A13) (6.0 g), and the mixture was stirred at room temperature for 5 hours for dissolution. BCS (30.0 g) was added to this solution, and the mixture was stirred at room temperature for 5 hours to obtain a liquid crystal aligning agent B13.

<Methacrylate Polymer Synthesis Example 14>

MA1 (20.4 g, 50.0 mmol) and MA2 (15.3 g, 50.0 mmol) were dissolved in NMP (302.5 g), degassed with a diaphragm pump and purged with nitrogen, then AIBN (0.82 g, 5.0 mmol) was added thereto and degassing and purging with nitrogen were performed again. After that, the mixture was reacted at 60° C. for 24 hours to obtain a polymer solution of methacrylate. This polymer solution was added dropwise to methanol (5000 ml), and the resulting precipitate was filtered. This precipitate was washed with methanol and dried under reduced pressure in an oven at 40° C. to obtain methacrylate polymer powder. The obtained methacrylate polymer had a number average molecular weight of 18000 and a weight average molecular weight of 100000.

NMP (114.0 g) was added to the obtained methacrylic polymer powder (A14) (6.0 g), and the mixture was stirred at room temperature for 5 hours for dissolution. BCS (30.0 g) was added to this solution, and the mixture was stirred at room temperature for 5 hours to obtain a liquid crystal aligning agent B14.

<Methacrylate Polymer Synthesis Example 15>

MA1 (20.4 g, 50.0 mmol), MA2 (15.3 g, 50.0 mmol), and Side 5 (3.5 g, 10.0 mmol) were dissolved in NMP (302.5 g), degassed with a diaphragm pump and purged with nitrogen, then AIBN (0.82 g, 5.0 mmol) was added thereto and degassing and purging with nitrogen were performed again.

After that, the mixture was reacted at 60° C. for 24 hours to obtain a polymer solution of methacrylate. This polymer solution was added dropwise to methanol (5000 ml), and the resulting precipitate was filtered. This precipitate was washed with methanol and dried under reduced pressure in an oven at 40° C. to obtain methacrylate polymer powder. The obtained methacrylate polymer had a number average molecular weight of 21000 and a weight average molecular weight of 110000.

NMP (114.0 g) was added to the obtained methacrylic polymer powder (A15) (6.0 g), and the mixture was stirred at room temperature for 5 hours for dissolution. BCS (30.0 g) was added to this solution, and the mixture was stirred at room temperature for 5 hours to obtain a liquid crystal aligning agent B15.

Example 1

[Production of Liquid Crystal Cell]

A twisted nematic liquid crystal cell was produced by using the liquid crystal aligning agent B1 obtained in methacrylate polymer synthesis example 1 by the following procedure.

The liquid crystal aligning agent B1 obtained in Example 1 was spin-coated on the ITO surface of an ITO electrode substrate on which an ITO electrode pattern was formed, dried for 90 seconds on a 70° C. hot plate, irradiated with 50 mJ/cm2 of 313 nm polarized ultraviolet light tilted by 40° from the horizontal direction with respect to the substrate, and heated on a 200° C. hot plate for 20 minutes to form a liquid crystal alignment film with a thickness of 100 nm. Regarding the two substrates described above, a 6 μm bead spacer was scattered on the liquid crystal alignment film of one substrate, and then a sealant (a solvent type thermosetting type epoxy resin) was printed thereon. Next, the two substrates were stuck together such that the alignment directions are orthogonal, and then the sealant was cured to prepare an empty cell. A liquid crystal MLC-2003 (C080) (trade name, manufactured by Merck Ltd.) was injected into this empty cell by vacuum injection method to produce a twisted nematic liquid crystal cell. After that, the produced liquid crystal cell was placed in a hot air circulation type oven at 120° C. for 1 hour to realign the liquid crystal.

Example 2

A twisted nematic liquid crystal cell was produced in the same manner as in Example 1 except that the liquid crystal alignment film described above was changed to B2.

Example 3

A twisted nematic liquid crystal cell was produced in the same manner as in Example 1 except that the liquid crystal alignment film described above was changed to B3.

Example 4

A twisted nematic liquid crystal cell was produced in the same manner as in Example 1 except that the liquid crystal alignment film described above was changed to B4.

Example 5

A twisted nematic liquid crystal cell was produced in the same manner as in Example 1 except that the liquid crystal alignment film described above was changed to B5.

Example 6

A twisted nematic liquid crystal cell was produced in the same manner as in Example 1 except that the liquid crystal alignment film described above was changed to B6.

Example 7

A twisted nematic liquid crystal cell was produced in the same manner as in Example 1 except that the liquid crystal alignment film described above was changed to B7.

Example 8

A twisted nematic liquid crystal cell was produced in the same manner as in Example 1 except that the liquid crystal alignment film described above was changed to B8.

Example 9

A twisted nematic liquid crystal cell was produced in the same manner as in Example 1 except that the liquid crystal alignment film described above was changed to B9 and the firing temperature was changed to 220° C.

Example 10

A twisted nematic liquid crystal cell was produced in the same manner as in Example 1 except that the liquid crystal alignment film described above was changed to B10.

Example 11

A twisted nematic liquid crystal cell was produced in the same manner as in Example 1 except that the liquid crystal alignment film described above was changed to B11.

Example 12

A twisted nematic liquid crystal cell was produced in the same manner as in Example 1 except that the liquid crystal alignment film described above was changed to B12.

Example 13

A twisted nematic liquid crystal cell was produced in the same manner as in Example 1 except that the liquid crystal alignment film described above was changed to B13.

Comparative Examples 1 and 2

In Comparative Example 1, a twisted nematic liquid crystal cell was produced in the same manner as in Example 1 except that the liquid crystal alignment film described above was changed to B14, and, in Comparative Example 2, a twisted nematic liquid crystal cell was produced in the same procedure as Example 1 except that the liquid crystal alignment film was changed to B15.

(Measurement of Pretilt Angle)

The pretilt angle (°) of the twisted nematic liquid crystal cell was measured by using a Muller matrix method with "Axo Scan" manufactured by Axo Metrix Co., Ltd. The results are as shown in Table 1 below.

TABLE 1

| Liquid crystal aligning agent | Photoreactive component MA1 | Composition of methacrylic monomer (mmol) | | | | | | | | | Firing temperature (° C.) | Pretilt angle (°) |
|---|---|---|---|---|---|---|---|---|---|---|---|---|---|
| | | Liquid crystalline component | | | Tilt imparting component | | | | | | | | |
| | | MA2 | MA3 | MA4 | Side1 | Side2 | Side3 | Side4 | Side5 | Side6 | Side7 | | |
| Example 1 | B1 | 50 | 50 | | 30 | | | | | | | 200 | 2 |
| Example 2 | B2 | 50 | 50 | | | 10 | | | | | | 200 | 3.9 |
| Example 3 | B3 | 50 | 50 | | | 20 | | | | | | 200 | 6.9 |
| Example 4 | B4 | 50 | 50 | | | | 10 | | | | | 200 | 5.2 |
| Example 5 | B5 | 50 | 50 | | | | 30 | | | | | 200 | 11.9 |
| Example 6 | B6 | 50 | 50 | | | | | 10 | | | | 200 | 6 |
| Example 7 | B7 | 50 | 50 | | | | | | 10 | | | 200 | 1.4 |
| Example 8 | B8 | 50 | 50 | | | | | | 30 | | | 200 | 1.8 |
| Example 9 | B9 | 50 | 50 | | | | | | | 10 | | 220 | 6.3 |
| Example 10 | B10 | 50 | 50 | | | | | | | 30 | | 200 | 15 |
| Example 11 | B11 | 50 | | 50 | | | 10 | | | | | 200 | 2.5 |
| Example 12 | B12 | 50 | 25 | | 25 | | 10 | | | | | 200 | 4.4 |
| Example 13 | B13 | 50 | | 25 | 25 | | 10 | | | | | 200 | 4.2 |
| Comparative Example 1 | B14 | 50 | 50 | | | | | | | | | 220 | 1.1 |
| Comparative Example 2 | B15 | 50 | 50 | | | | | | | | 10 | 200 | 0 |

As shown in Table 1, in all the cases of using the liquid crystal alignment films of Examples 1 to 13, it was possible to obtain a liquid crystal pretilt angle suitable for a twisted nematic mode. The reason why the tilt angle was not developed in Comparative Example 2 is presumed to be that the self-assembly of the liquid crystal alignment film by heat was hindered because the alkyl chain of the tilt imparting component was long.

Example 14

A twisted nematic liquid crystal cell was produced in the same procedure as in Example 4.

Example 15

A twisted nematic liquid crystal cell was produced in the same procedure as in Example 9.

Comparative Example 3

A coating film having a thickness of 100 nm was formed as a liquid crystal alignment film by using SE-7492 manufactured by Nissan Chemical Industries, Ltd. as a liquid crystal aligning agent B16, drying on a hot plate at 80° C. for 70 seconds, and then baking on a hot plate at 250° C. for 10 minutes. This coating film surface was rubbed with a rayon cloth by using a rubbing apparatus having a roll diameter of 120 mm under the conditions of a roll rotation number of 1000 rpm, a roll advancing speed of 50 mm/sec, and a pushing amount of 0.3 mm to obtain a substrate with a liquid crystal alignment film. A twisted nematic liquid crystal cell was produced in the same procedure as in Example 1 except for the above.

<Methacrylate Polymer Synthesis Example 16>

MA5 (25.7 g, 50.0 mmol) was dissolved in NMP (233.1 g), degassed with a diaphragm pump and purged with nitrogen, then AIBN (0.16 g, 1.0 mmol) was added thereto and degassing and purging with nitrogen were performed again. After that, the mixture was reacted at 60° C. for 24 hours to obtain a polymer solution of methacrylate. This polymer solution was added dropwise to diethyl ether (5000 ml), and the resulting precipitate was filtered. This precipitate was washed with diethyl ether and dried under reduced pressure in an oven at 40° C. to obtain methacrylate polymer powder P16. The obtained methacrylate polymer had a number average molecular weight of 25000 and a weight average molecular weight of 300000.

Chloroform (294.0 g) was added to the obtained methacrylic polymer powder (A16) (6.0 g), and the mixture was stirred at room temperature for 5 hours for dissolution to obtain a liquid crystal aligning agent B17.

Comparative Example 4

A twisted nematic liquid crystal cell was produced in the same manner as in Example 1 except that the liquid crystal alignment film described above was changed to B17, the amount of exposure to ultraviolet light was changed to 300 mJ/cm$^2$, and the baking temperature was changed to 220° C.

Comparative Example 5

NMP (114 g) and BCS (30 g) were added to the methacrylic polymer powder (A16) (6.0 g), and the mixture was stirred at room temperature for 12 hours for dissolution to prepare a liquid crystal aligning agent B18. After that, a liquid crystal cell was produced in the same manner as in Comparative Example 4 and realigned in an oven. Then, the liquid crystal cell nipped between polarizing plates was observed. As a result, alignment defects were observed and the pretilt angle could not be measured, and the liquid crystal aligning agent could not be used as a liquid crystal alignment film.

(Evaluation of Alignment Stability)

The twisted nematic liquid crystal cell was irradiated with a backlight under a 60° C. environment for 192 hours while applying stress of AC 10 Vp-p, and measurement of pretilt angle before and after the stress was carried out. The measurement result was calculated on the basis of the following formula and evaluated.

ΔTilT (°)=initial pretilt angle−pretilt angle after stress    (5)

The results are as shown in Table 2 below.

TABLE 2

| | Liquid crystal aligning agent | ΔTilt [°] (Initial-after stress) |
|---|---|---|
| Example 14 | B4 | 0.2 |
| Example 15 | B9 | 0.3 |
| Comparative Example 3 | B16 | 0.6 |
| Comparative Example 4 | B17 | 0.2 |
| Comparative Example 5 | B18 | Unmeasurable |

As shown in Table 2, in both of the cases of using the liquid crystal alignment films of Examples 14 and 15, it can be seen that the pretilt change due to stress is smaller than that of the rubbing material of Comparative Example 3, and the material is excellent in alignment stability. It is presumed that the reason for this is that the anisotropy was highly efficiently imparted by utilizing the self-assembly of the liquid crystal alignment film.

What is claimed is:

1. A polymer composition, comprising:
   (A) a side chain polymer which is a photosensitive side chain polymer exhibiting liquid crystallinity in a predetermined temperature range and has a repeating unit comprising from 0.1 to 50 mol % of a vertically alignable group; and
   (B) an organic solvent;
   wherein the vertically alignable group is
   at least one member selected from the group consisting of alkyl having 6 to 17 carbon atoms:
   wherein component (A) comprises one or more photosensitive sidechains of the following formula:

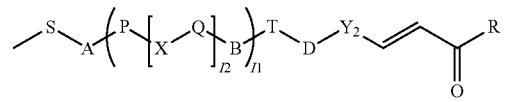

wherein A, B, and D each independently represent a single bond, —O—, —CH₂—, —COO—, —OCO—, —CONH—, —NH—CO—, —CH=CH—CO—O—, or —O—CO—CH=CH—;
   S represents an alkylene group having 1 to 12 carbon atoms, and a hydrogen atom bonded thereto may be replaced with a halogen group;
   T represents a single bond or an alkylene group having 1 to 12 carbon atoms, and a hydrogen atom bonded thereto may be replaced with a halogen group;
   Y₂ represents a group selected from the group consisting of a divalent benzene ring, a naphthalene ring, a biphenyl ring, a furan ring, a pyrrole ring, an alicyclic hydrocarbon having 5 to 8 carbon atoms, and a combination thereof, and hydrogen atoms bonded thereto may be each independently substituted with —NO₂, —CN, —CH=C(CN)₂, —CH=CH—CN, a halogen group, an alkyl group having 1 to 5 carbon atoms, or an alkyloxy group having 1 to 5 carbon atoms;
   R represents hydroxy;
   P and Q each independently represent a group selected from the group consisting of a divalent benzene ring, a naphthalene ring, a biphenyl ring, a furan ring, a pyrrole ring, an alicyclic hydrocarbon having 5 to 8 carbon atoms, and a combination thereof, and when X is CH=CH—CO—O— or —O—CO—CH=CH—, P or Q on a side to which —CH=CH— is bonded is an aromatic ring; and
   l1 represents 0 or 1;
   l2 represents an integer of 0 to 2;
   when both l1 and l2 are 0, A also represents a single bond when T is a single bond;
   when l1 is 1, B also represents a single bond when T is a single bond.

2. The polymer composition of claim 1, wherein the component (A) has one or a plurality of liquid crystalline side chains selected from the group consisting of the following formulae (21) to (31):

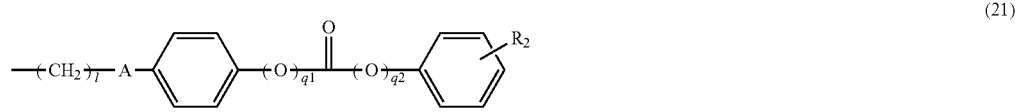

(21)

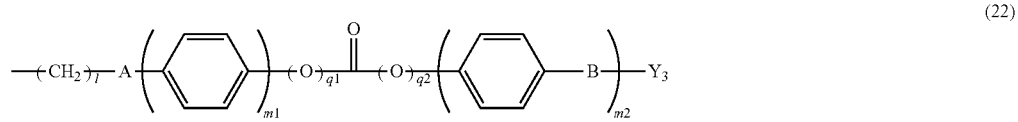

(22)

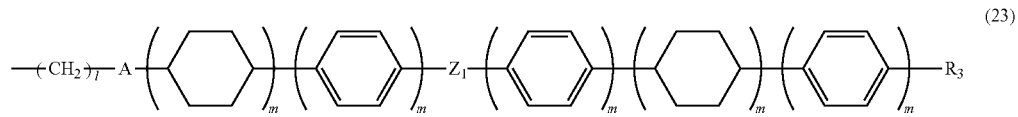

(23)

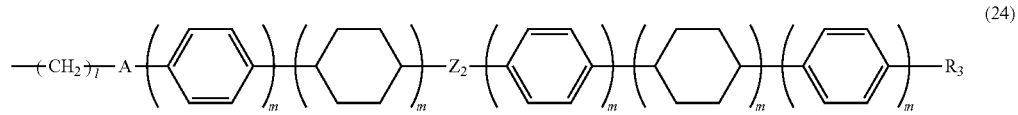

(24)

-continued

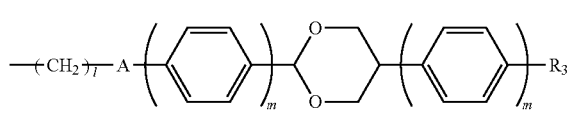 (25)

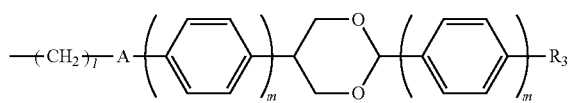 (26)

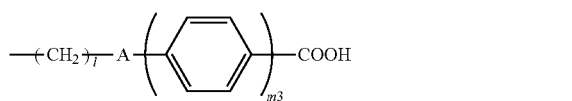 (27)

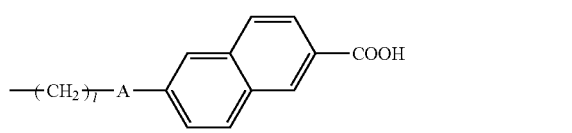 (28)

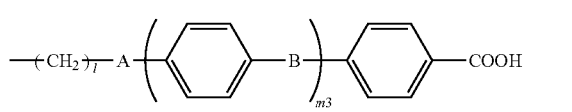 (29)

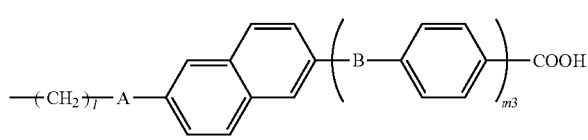 (30)

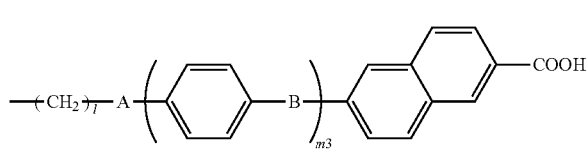 (31)

wherein:

A and B each independently represent a single bond, —O—, —$CH_2$—, —COO—, —OCO—, —CONH—, —NH—CO—, —CH=CH—CO—O—, or —O—CO—CH=CH—;

$Y_3$ is a group selected from the group consisting of a monovalent benzene ring, a naphthalene ring, a biphenyl ring, a furan ring, a nitrogen-containing heterocyclic ring, an alicyclic hydrocarbon having 5 to 8 carbon atoms, and a combination thereof, and hydrogen atoms bonded thereto may be each independently substituted with —$NO_2$, —CN, a halogen group, an alkyl group having 1 to 5 carbon atoms, or an alkyloxy group having 1 to 5 carbon atoms;

$R_3$ represents a hydrogen atom, —$NO_2$, —CN, —CH=C$(CN)_2$, —CH=CH—CN, a halogen group, a monovalent benzene ring, a naphthalene ring, a biphenyl ring, a furan ring, a nitrogen-containing heterocyclic ring, an alicyclic hydrocarbon having 5 to 8 carbon atoms, an alkyl group having 1 to 12 carbon atoms, or an alkoxy group having 1 to 12 carbon atoms;

one of q1 and q2 is 1 and the other is 0;

l represents an integer of 1 to 12, and m represents an integer of 0 to 2, provided that the sum of all ms in the formulae (23) and (24) is 2 or more, the sum of all ms in the formulae (25) and (26) is 1 or more, and m1, m2, and m3 each independently represent an integer of 1 to 3;

$R_2$ represents a hydrogen atom, —$NO_2$, —CN, a halogen group, a monovalent benzene ring, a naphthalene ring, a biphenyl ring, a furan ring, a nitrogen-containing heterocyclic ring, an alicyclic hydrocarbon having 5 to 8 carbon atoms, an alkyl group, or an alkyloxy group; and $Z_1$ and $Z_2$, each represent a single bond, —CO—, —$CH_2$O—, —CH=N—, or —$CF_2$—.

3. A method for producing a substrate comprising a liquid crystal alignment film having an alignment control ability, wherein the liquid crystal alignment film is obtained by a method comprising:

[I] applying the composition according to claim 1 onto a substrate having an electrode for driving a liquid crystal to form a coating film;

[II] irradiating the coating film obtained in [I] with polarized ultraviolet light in an oblique direction; and

[III] heating the coating film obtained in [II].

4. A substrate comprising the liquid crystal alignment film produced by the method according to claim 3.

5. A twisted nematic type liquid crystal display element, comprising the substrate according to claim 4.

6. A method for producing a twisted nematic type liquid crystal display element, wherein the liquid crystal display element is obtained by a method comprising:

preparing a first substrate, which is the substrate according to claim 4;

obtaining a second substrate comprising a liquid crystal alignment film having alignment control ability in which the liquid crystal alignment film is obtained by a method comprising

[I'] applying the polymer composition on a second substrate to form a coating film,

[II'] irradiating the coating film obtained in [I'] with polarized ultraviolet light,

[III'] heating the coating film obtained in [II'], and

[IV] obtaining a liquid crystal display element by arranging the first substrate and the second substrate to oppose each other such that the liquid crystal alignment films of the first substrate and the second substrate oppose each other through liquid crystal and directions of liquid crystal alignment are orthogonal to each other.

7. A twisted nematic type liquid crystal display element, produced by the method according to claim 6.

8. The polymer composition if claim 1 wherein the vertically alignable group is at least one member selected from the group consisting of $C_6H_{13}$, $C_{12}H_{25}$, and $C_{16}H_{33}$.

9. The polymer composition of claim 8 wherein the vertically alignable group is $C_6H_{13}$.

10. The polymer composition of claim 8 wherein the vertically alignable group is $C_{12}H_{25}$.

11. The polymer composition of claim 8 wherein the vertically alignable group is $C_{16}H_{33}$.

\* \* \* \* \*